US012103437B2

(12) United States Patent
Kuroda

(10) Patent No.: US 12,103,437 B2
(45) Date of Patent: Oct. 1, 2024

(54) SEAT SLIDING DEVICE

(71) Applicant: TF-METAL Co., Ltd., Shizuoka (JP)

(72) Inventor: Shunsuke Kuroda, Shizuoka (JP)

(73) Assignee: TF-METAL Co., Ltd., Shizuoka (JP)

( * ) Notice: Subject to any disclaimer, the term of this patent is extended or adjusted under 35 U.S.C. 154(b) by 0 days.

(21) Appl. No.: 18/168,125

(22) Filed: Feb. 13, 2023

(65) Prior Publication Data
US 2023/0256872 A1    Aug. 17, 2023

(30) Foreign Application Priority Data

Feb. 15, 2022    (JP) ................................. 2022-021041

(51) Int. Cl.
*B60N 2/08*    (2006.01)

(52) U.S. Cl.
CPC .......... *B60N 2/0818* (2013.01); *B60N 2/0875* (2013.01); *B60N 2/0881* (2013.01)

(58) Field of Classification Search
CPC .. B60N 2/0818; B60N 2/0875; B60N 2/0812; B60N 2/0831; B60N 2/0862; B60N 2/0881; B60N 2/0887
USPC ........................................ 248/424, 429, 430
See application file for complete search history.

(56) References Cited

U.S. PATENT DOCUMENTS

| | | | | |
|---|---|---|---|---|
| 6,089,521 A * | 7/2000 | Tarusawa | ................ | B60N 2/085 296/65.14 |
| 7,314,204 B2 * | 1/2008 | Kohmura | ............. | B60N 2/0705 248/430 |
| 8,695,937 B2 * | 4/2014 | Yamada | ................ | B60N 2/0727 296/65.13 |
| 8,936,227 B2 * | 1/2015 | Kawamura | .......... | B60N 2/0705 248/548 |
| 9,004,437 B2 * | 4/2015 | Yamada | ................ | B60N 2/0818 296/65.13 |
| 9,038,981 B2 * | 5/2015 | Hoshihara | ............ | B60N 2/0727 248/429 |
| 9,145,069 B2 * | 9/2015 | Yamada | ................ | B60N 2/0875 |
| 9,156,376 B2 * | 10/2015 | Yamada | ................ | B60N 2/0705 |
| 9,162,588 B2 * | 10/2015 | Yamada | ................ | B60N 2/0705 |
| 9,283,870 B2 | 3/2016 | Yamada et al. | | |
| 9,315,119 B2 * | 4/2016 | Yamada | ................ | B60N 2/0887 |
| 9,327,615 B2 * | 5/2016 | Yamada | ................ | F16C 29/043 |

(Continued)

FOREIGN PATENT DOCUMENTS

| | | |
|---|---|---|
| JP | 2013-18400 A | 1/2013 |
| JP | 2014-83890 A | 5/2014 |

*Primary Examiner* — Jonathan Liu
*Assistant Examiner* — Guang H Guan
(74) *Attorney, Agent, or Firm* — Young Basile Hanlon & MacFarlane, P.C.

(57)    ABSTRACT

A seat sliding device includes a lever member, a lock member, a biasing member, and an operation member. The biasing member is formed of a bar-shaped member and includes a front acting portion configured to come in contact with a front end of the lever member to bias the front end of the lever member upward, a rear acting portion configured to come in contact with a rear end of the lever member to bias the rear end of the lever member upward, and an intermediate support portion formed between the front acting portion and the rear acting portion and engaged with a an engaging portion formed in an upper rail. The engaging portion supports the intermediate support portion at a position rearward of a turning center of the lever member (shaft member).

6 Claims, 22 Drawing Sheets

(56) References Cited

U.S. PATENT DOCUMENTS

| | | | | |
|---|---|---|---|---|
| 9,327,616 | B2* | 5/2016 | Hoshihara | B60N 2/0856 |
| 9,701,219 | B2* | 7/2017 | Nagura | B60N 2/0875 |
| 9,731,629 | B2* | 8/2017 | Yamada | B60N 2/0818 |
| 9,783,084 | B2* | 10/2017 | Kumagai | B60N 2/0806 |
| 11,110,825 | B2* | 9/2021 | Taniguchi | B60N 2/0705 |
| 11,180,054 | B2* | 11/2021 | Taniguchi | B60N 2/0818 |
| 11,192,472 | B2* | 12/2021 | Taniguchi | B60N 2/0727 |
| 11,872,912 | B2* | 1/2024 | Kuroda | B60N 2/0881 |
| 2014/0138510 | A1 | 5/2014 | Yamada et al. | |
| 2023/0256871 | A1* | 8/2023 | Kuroda | B60N 2/0875 |
| | | | | 248/430 |
| 2023/0256872 | A1* | 8/2023 | Kuroda | B60N 2/0715 |
| | | | | 248/429 |
| 2024/0100999 | A1* | 3/2024 | Kuroda | B60N 2/0818 |

\* cited by examiner

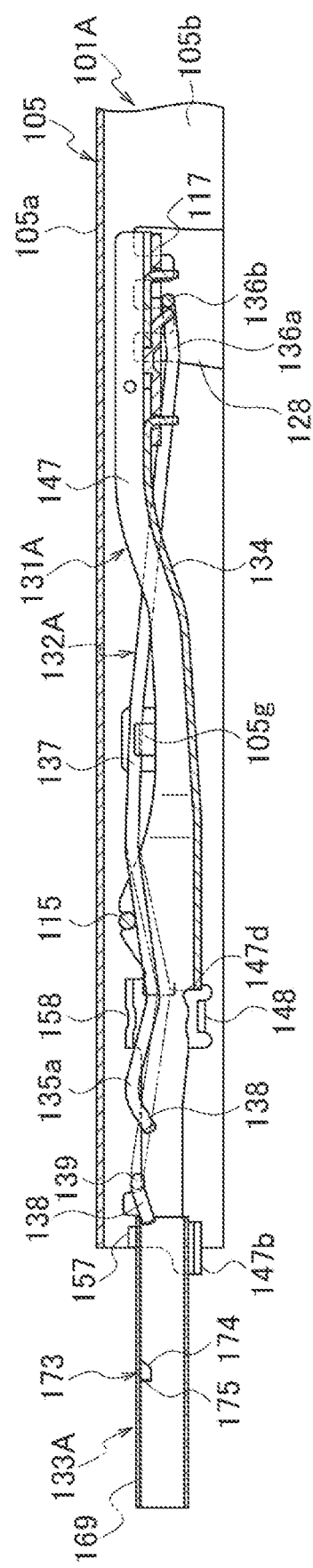

SEAT SLIDING DEVICE

CROSS REFERENCE TO RELATED APPLICATION

The present application is based on, and claims priority from Japanese Patent Application No. 2022-021041, filed on Feb. 15, 2022, the entire contents of which are incorporated herein by reference.

TECHNICAL FIELD

The present disclosure relates to a seat sliding device used for a seat for a vehicle.

BACKGROUND

In a seat sliding device for a vehicle, an upper rail fixed to a seat is provided to be slidably movable on a lower rail fixed to a vehicle body, and lock teeth (lock portions) of a lock member attached to the upper rail engage with lock grooves (locked portions) in the lower rail to lock the seat. The seat sliding device is provided with a lever member for operating the lock portions in a lock release direction, and the front side part of the lever member from the turning center is biased upward by a biasing member. An operation member is connected to the front end of the lever member, and the lever member is configured to rotate with the operation member by lifting the operation member upward.

In JP2014-83890 A, a lever member is turnably supported about an axis in the left-right direction with respect to the upper rail, and lock portions provided at the rear end of the lever member are biased by a first biasing member in the direction (lock direction) of engagement with lock grooves provided so as to be continuous in the vehicle front-rear direction. The lock grooves are provided in the lower rail. In addition, an operation member is connected to the front end of the lever member, and the lever member is configured to turn upward integrally by lifting the operation member upward. Between the operation member and the lever member, a second biasing member is provided to prevent the movement of the operation member in the removal direction with respect to the lever member and to bias the operation member in the lock release direction with a biasing force weaker than that of the first biasing member. Here, in JP2014-83890 A, the first biasing member and the second biasing member are constituted of separate components because the biasing force is different from each other.

Meanwhile, JP2013-18400 A discloses a structure in which the above two biasing members are constituted of one component (spring member). In JP2014-83890 A, in order to vary a biasing force between the front end and the rear end of the biasing member, the intermediate portion of the biasing member is engaged with the upper rail at two points so as not to move, and the front-end side is made to have a weak biasing force and the rear-end side is made to have a strong biasing force by varying the lengths of the front end and the rear end and the amounts of displacement.

SUMMARY

However, in the structure of JP2013-18400 A, the intermediate portion of the biasing member is engaged with the upper rail at two points, which not only complicates the shape of the biasing member but also makes it difficult to assemble the biasing member to the upper rail.

Accordingly, an object of the present invention is provide to simplify the shape of a biasing member and to improve the ease of assembling a biasing member to an upper rail.

A seat sliding device according to the present invention includes a lower rail extending in a vehicle front-rear direction, an upper rail configured to move relative to the lower rail in a longitudinal direction, a lever member turnably supported about an axis in a left-right direction with respect to the upper rail, a lock member provided in a rear end of the lever member and including lock portions configured to be movable between a lock position where the lock portions engage with locked portions formed in the lower rail and a lock release position where the lock portions come away from the locked portions, a biasing member configured to bias the lock portions in a lock position direction, and an operation member connected to a front end of the lever member. The biasing member is formed of a bar-shaped member and includes a front acting portion configured to come in contact with the front end of the lever member to bias the front end of the lever member upward, a rear acting portion configured to come in contact with the rear end of the lever member to bias the rear end of the lever member upward, and an intermediate support portion formed between the front acting portion and the rear acting portion and engaged with a engaging portion formed in the upper rail. The engaging portion is positioned rearward of a turning center of the lever member and supports the intermediate support portion in such a way as to prevent the intermediate support portion from moving downward.

The present invention makes it possible to simplify the shape of a biasing member and to improve the ease of assembling a biasing member to an upper rail.

BRIEF DESCRIPTION OF THE DRAWINGS

FIG. 22B is a side sectional view of an enlarged main portion of the seat sliding device illustrating a state before the operation member is attached.

DETAILED DESCRIPTION

Embodiments of the present invention will be described below with reference to the drawings.

First Embodiment

Figure 1:
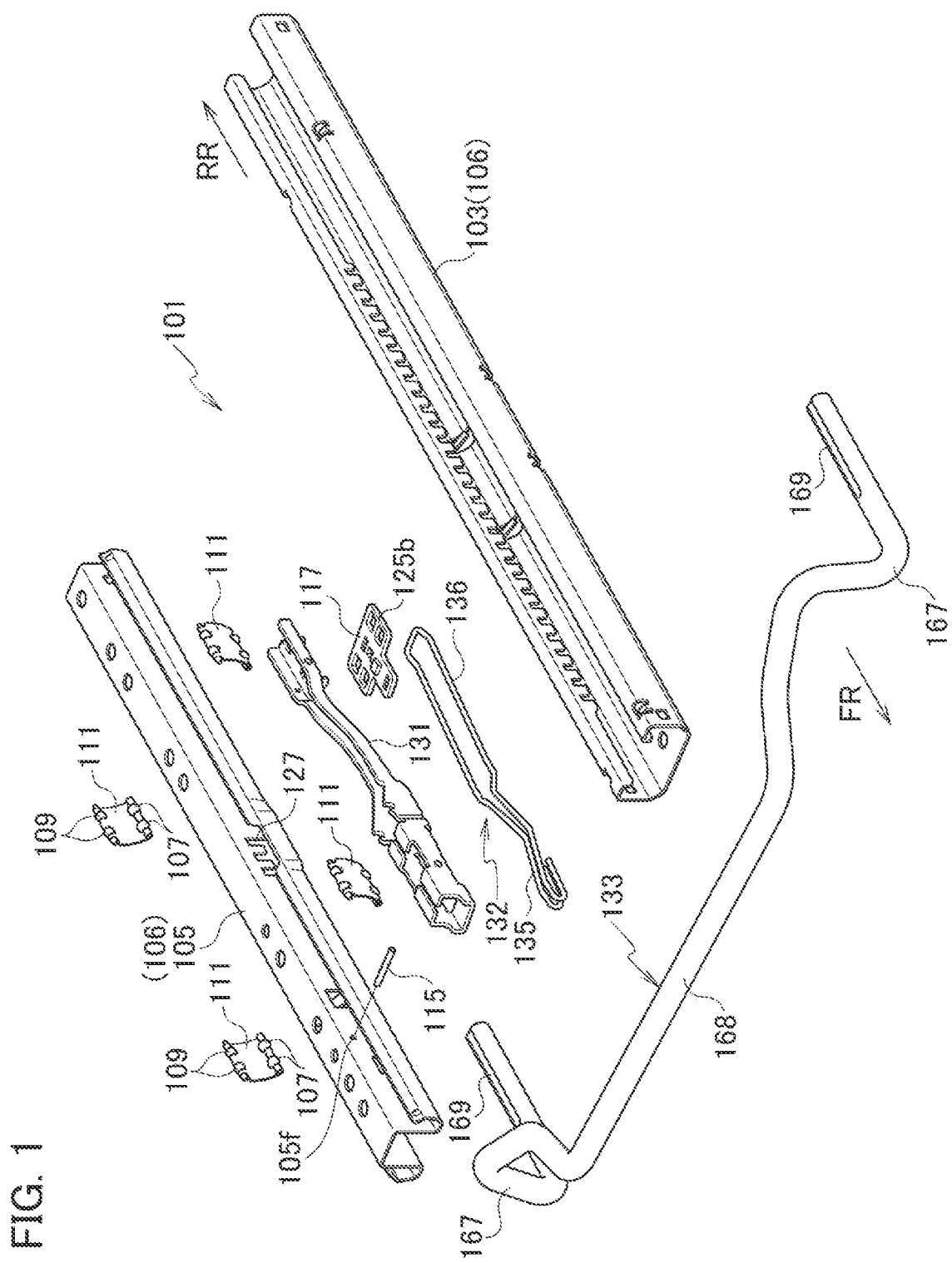
FIG. 1 is an exploded perspective view of a seat sliding device according to a first embodiment of the present invention.
Figure 2:
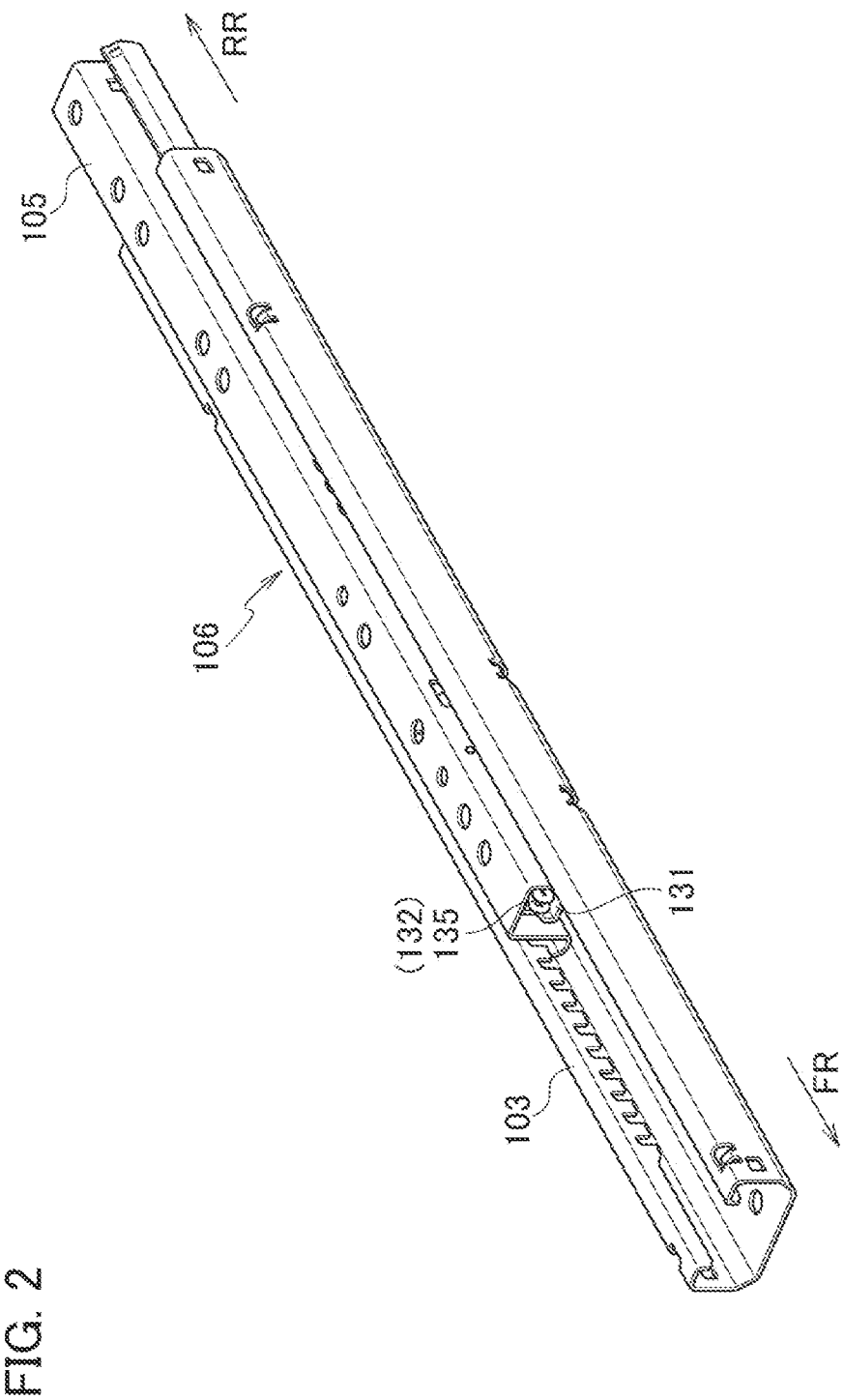
FIG. 2 is a perspective view illustrating a state in which an upper rail is assembled to a lower rail, together with a lever member and a biasing member.
Figure 3:
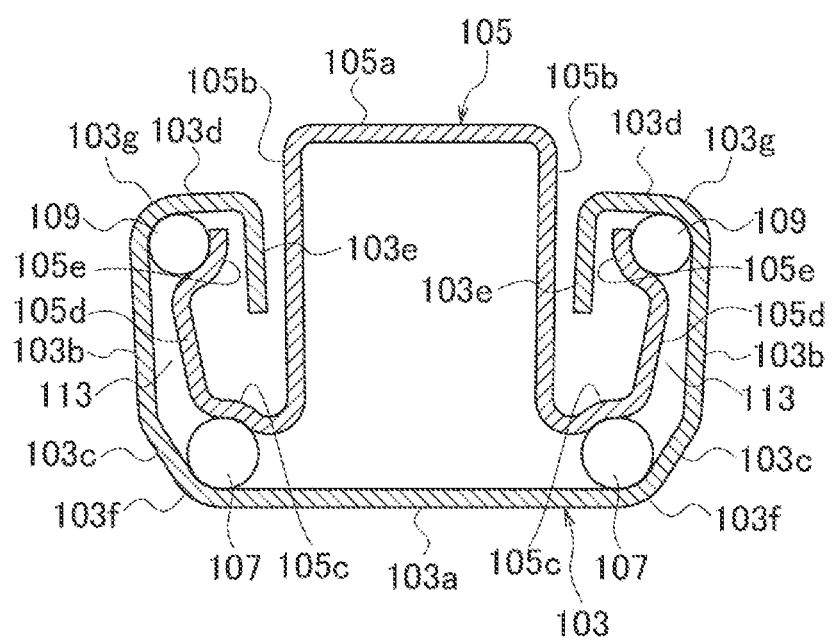
FIG. 3 is a cross-sectional view of the seat sliding device including lower guide balls and upper guide balls disposed between the upper rail and the lower rail.

A seat sliding device 101 according to a first embodiment of the present invention illustrated in FIGS. 1 to 3 is a manual seat sliding device in which the position of a vehicle seat in a front-rear direction is adjusted manually. The seat sliding device 101 includes a lower rail 103 installed on a floor surface of a vehicle and extending in a vehicle front-rear direction, and an upper rail 105 installed on a back surface of a seating portion (not illustrated) of a seat and assembled to be movable within the lower rail 103 in a relative manner in a longitudinal direction of the lower rail 103. The lower rail 103 and the upper rail 105 form a rail body 106 and a pair of left and right rail bodies 106 are provided. Note that, in the following description (including the other embodiments), "front" is the vehicle front FR side which is the left side in FIG. 1, "rear" is the vehicle rear RR side which is the right side in FIG. 1, and "left-right" is the left-right direction when viewing the vehicle front side from the vehicle rear side.

As illustrated in FIG. 3, the lower rail 103 includes a lower bottom wall 103a having a rectangular plate shape extending in the vehicle front-rear direction. A pair of left and right lower outer walls 103b rise from both end edges of the lower bottom wall 103a in a vehicle width direction so as to tilt slightly outward from the lower bottom wall 103a in the upward direction. Lower tilted walls 103c are formed between the lower bottom wall 103a and lower ends of the respective left and right lower outer walls 103b. A pair of left and right lower upper walls 103d extending in parallel with the lower bottom wall 103a are provided from upper end edges of the respective left and right lower outer walls 103b in a direction approaching each other.

A pair of left and right lower inner walls 103e are provided to hang down from inner end edges of the respective left and right lower upper walls 103d toward the lower bottom wall 103a. Note that a clearance between the lower inner walls 103e disposed parallel to and facing each other is set large enough to allow movement of the upper rail 105 housed in the lower rail 103.

The upper rail 105 includes an upper top wall 105a having a rectangular plate shape extending in the vehicle front-rear direction. A pair of left and right upper side walls 105b hang down from both end edges of the upper top wall 105a in the vehicle width direction. Upper lower-tilted-walls 105c rise obliquely outward and upward from lower end edges of the respective left and right upper side walls 105b. Upper upper-tilted-walls 105e rise obliquely upward toward the lower upper walls 103d from upper end edges of the respective left and right upper lower-tilted-walls 105c via bent portions 105d.

Lower guide balls 107 are rotatably disposed between lower arc portions 103f of the lower rail 103 and the upper lower-tilted-walls 105c of the upper rail 105, and the lower arc portions 103f are formed between the lower bottom wall 103a and the lower tilted walls 103c of the lower rail 103. Upper guide balls 109 are rotatably disposed between upper arc portions 103g of the lower rail 103 and the upper upper-tilted-walls 105e of the upper rail 105, and the upper arc portions 103g are formed between the lower outer walls 103b and the lower upper walls 103d of the lower rail 103.

As illustrated in FIG. 1, the lower guide balls 107 and the upper guide balls 109 are rotatably supported in ball retainers 111 omitted in FIG. 3. Each of the ball retainers 111 supports a total of four balls which are two lower guide balls 107 and two upper guide balls 109. The ball retainers 111 supporting the lower guide balls 107 and the upper guide balls 109 are disposed at two positions on the front and the rear sides in housing portions 113 (FIG. 3) surrounded by the lower outer walls 103b, the lower tilted walls 103c, the lower upper walls 103d and the lower inner walls 103e, and are disposed at a total of four positions in the pair of left and right rail bodies 106.

Figure 14:
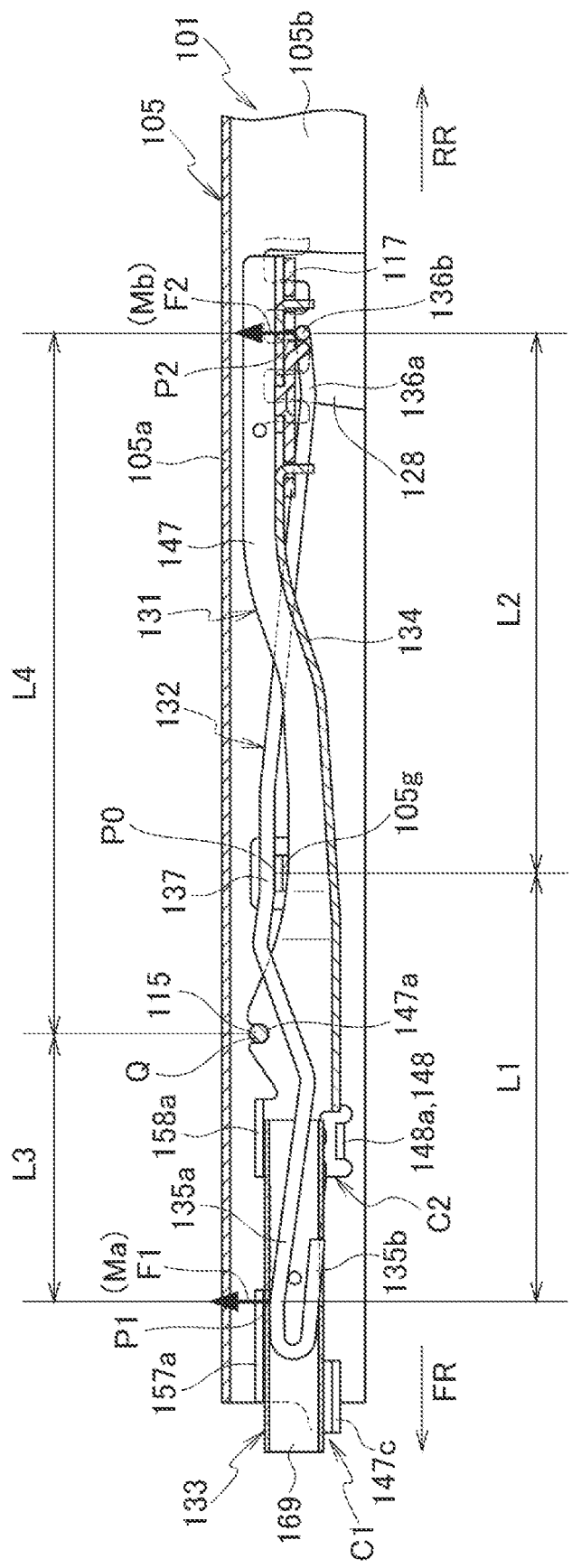
FIG. 14 is a side sectional view of the enlarged main portion of the seat sliding device.

As illustrated in FIG. 14, in the assembled state of the rail bodies 106, a lever member 131 is turnably supported by a shaft member 115 on the upper side wall 105b on the front side of the upper rail 105. The shaft member 115 extends between the left and right upper side walls 105b so as to straddle the left and right upper side walls 105b of the upper rail 105. A lock member 117 is provided at the end of the lever member 131 on the rear side from the turning center (shaft member 115). Meanwhile, an operation member 133 is connected to the end of the lever member 131 on the front side from the turning center (shaft member 115).

Figure 6:
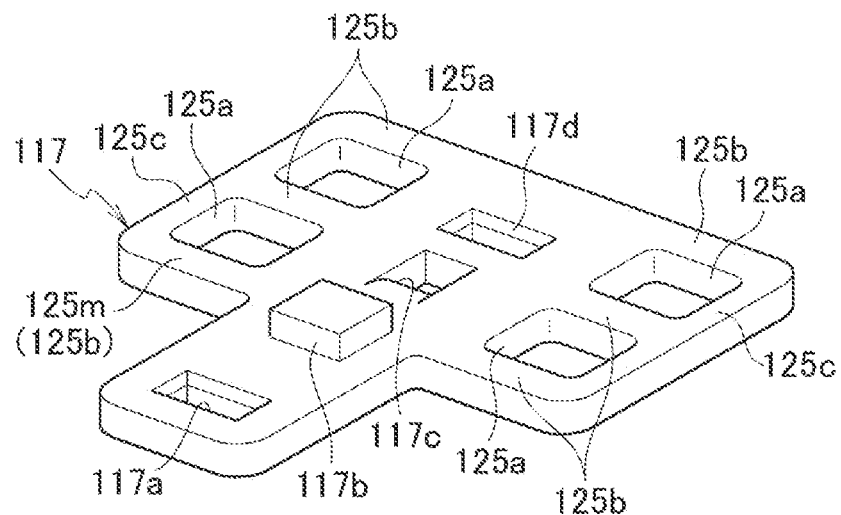
FIG. 6 is a perspective view of a lock member.

As illustrated in FIG. 6, the lock member 117 is a flat plate with a convex shape, and two rectangular holes 125a are formed near each of the left and right edges of the lock member 117 in the front-rear direction. Portions of the lock member 117 adjacent to the respective holes 125a in the front-rear direction form lock teeth 125b, which are lock portions, protruding leftward and rightward. The lock teeth 125b are formed at three positions on each of the left and right sides. Distal ends of the lock teeth 125b formed at the three positions on each of the left and right sides are configured to be connected to one another by respective connecting portions 125c extending in the front-rear direction.

In the present embodiment, among the lock teeth 125*b* at three positions on the right side in the vehicle width direction, the lock tooth 125*b* on the foremost side forms a main lock tooth 125*m*, which is formed with a larger width in the front-rear direction than the other lock teeth 125*b*. The main lock tooth 125*m* is only one among the plurality of lock teeth provided on each of the left and right sides (six positions).

In the center of the lock member 117 in the left-right direction, a front fixing hole 117*a*, an upper protrusion 117*b* protruding upward from the lock member 117, a lower protrusion 117*c* protruding downward from the lock member 117, and a rear fixing hole 117*d* are provided in this order from the front to the rear. The upper protrusion 117*b* is formed by causing a part of the lock member 117 to protrude downward, and the lower protrusion 117*c* is formed by cutting and raising the lock member 117 downward.

Figure 5:
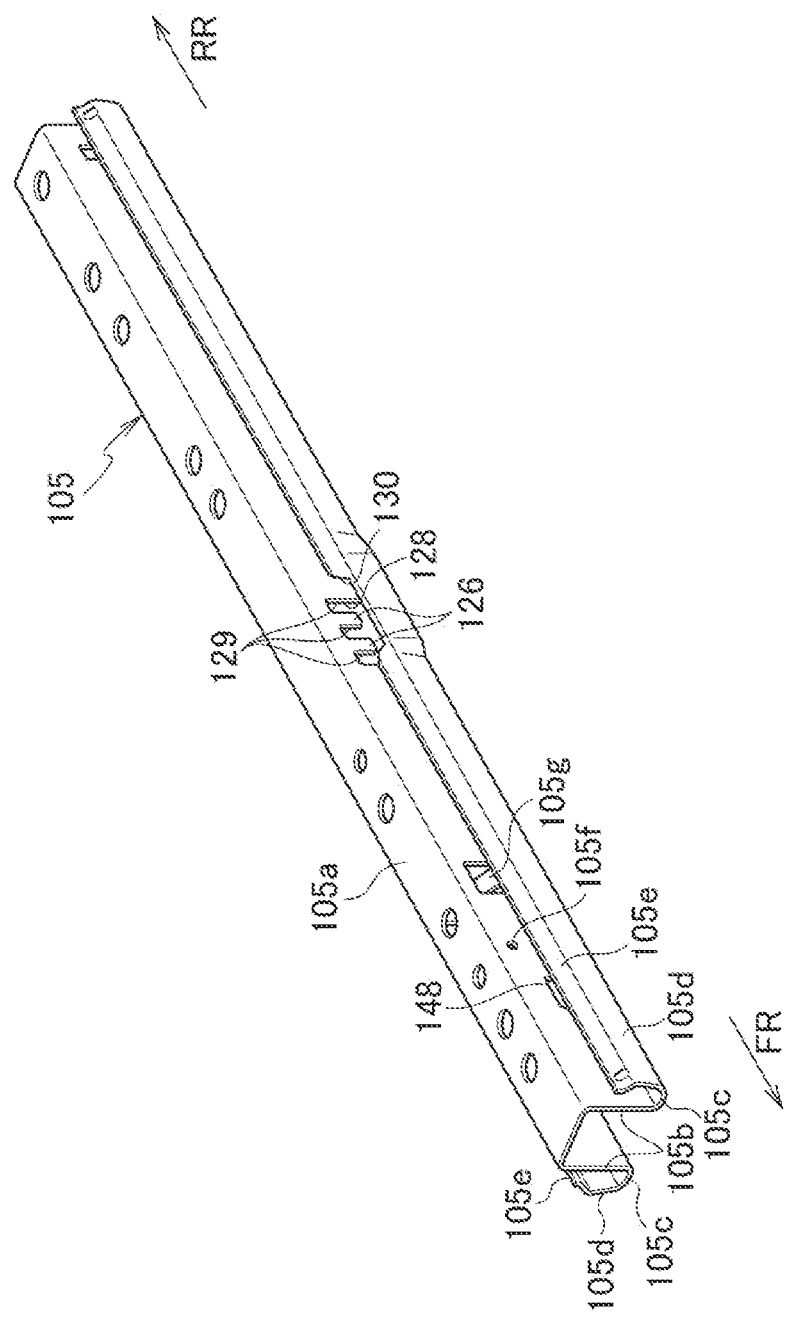
FIG. 5 is a perspective view of the upper rail.

As illustrated in FIG. 5, lock tooth receiving recesses 129 are formed near a substantially-center portion of the upper rail 105 in the front-rear direction so as to extend from the left and right upper side walls 105*b* to the left and right upper lower-tilted-walls 105*c*, and are formed at three positions on each of the left and right sides in the front-rear direction. In a state where the rail bodies 106 are assembled, the respective three lock teeth 125*b* of the lock member 117 are inserted into the three lock tooth receiving recesses 129 from below. At this time, protrusions 126 positioned between the lock tooth receiving recesses 129 are inserted into the holes 125*a* of the lock member 117. In this case, in order to avoid interference between the upper rail 105 and portions around the connecting portions 125*c* of the lock member 117, an opening 128 continuous with lower portions of the lock tooth receiving recesses 129 and a notch opening 130 formed in the upper upper-tilted-wall 105*e* are provided on each of the left and right sides of the upper rail 105.

Further, the left and right upper side walls 105*b* of the upper rail 105 are provided with a bearing hole 105*f* through which the shaft member 115 is inserted and a engaging portion 105*g* for engaging with a biasing member 132 which will be described later. In the upper side walls 105*b*, the engaging portion 105*g* is provided at the rear side of the lever member 131 from the turning center (shaft member 115). The engaging portion 105*g* is formed by cutting and raising the upper side walls 105*b* toward the inner side.

Figure 4:
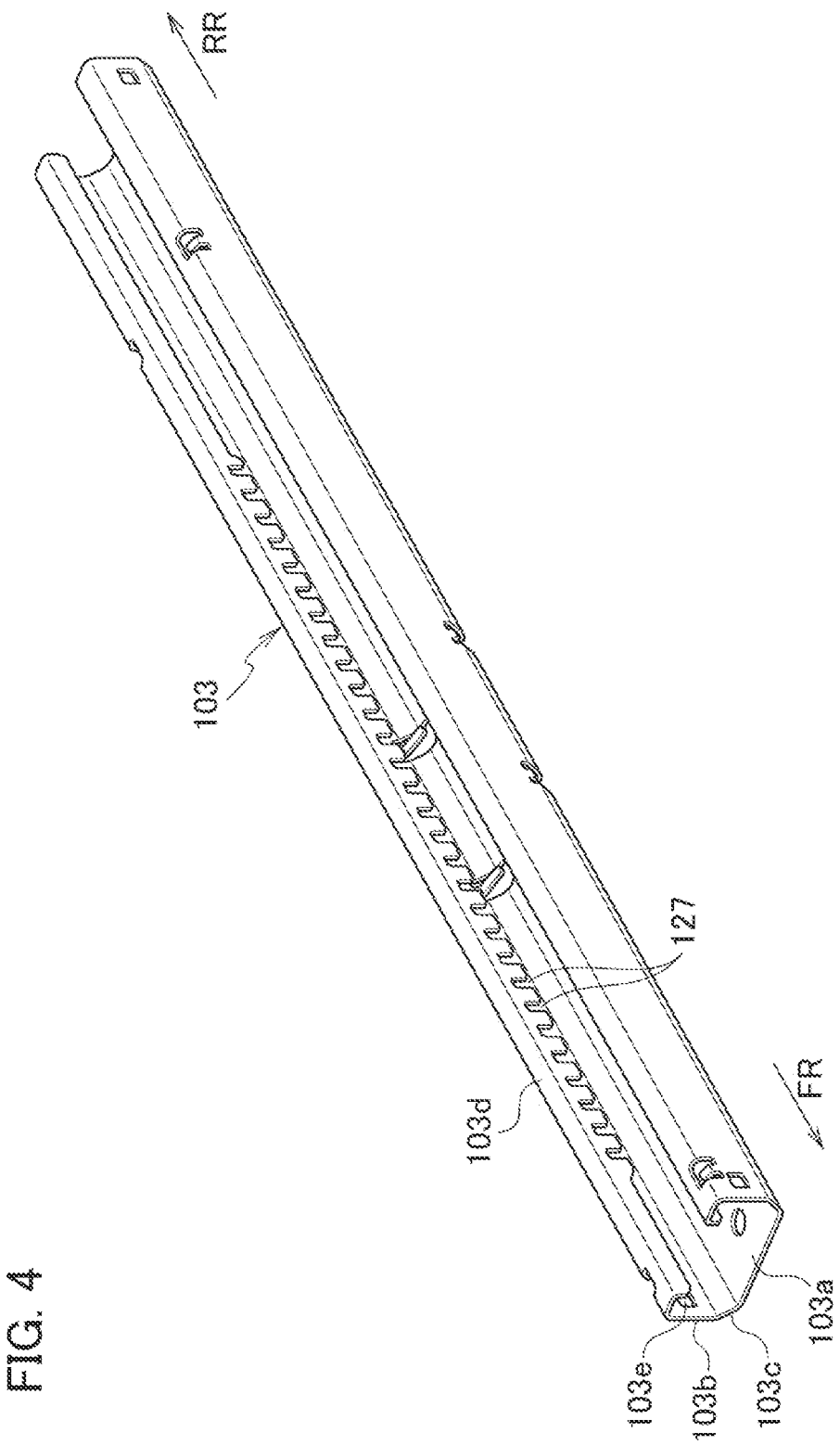
FIG. 4 is a perspective view of the lower rail.

Further as illustrated in FIG. 4, a plurality of lock grooves 127, which are locked portions, are provided in the lower rail 103 in the front-rear direction except for positions near front portions and rear portions of the left and right lower inner walls 103*e*. The lock member 117 is set to be locked to the lower rail 103 by inserting the lock teeth 125*b* of the lock member 117 into the lock grooves 127 from below with the lock teeth 125*b* positioned in the lock tooth receiving recesses 129. This makes it possible to prevent the upper rail 105 to which the lock member 117 is attached from moving relative to the lower rail 103 in the front-rear direction.

The biasing member 132 generates an elastic force upward in the state where the lock member 117 is attached to the upper rail 105, and thus, it is possible to maintain the state where the lock teeth 125*b* are inserted in the lock grooves 127. Operating the operation member 133 illustrated in FIG. 1 in the lock release direction (upward) in this state causes the lock member 117 to be pushed downward via the lever member 131, and thus the lock is released. The operation member 133 is inserted into the upper rail 105 from the front side, and is disposed so as to be interlocked with the lever member 131.

Figure 7:
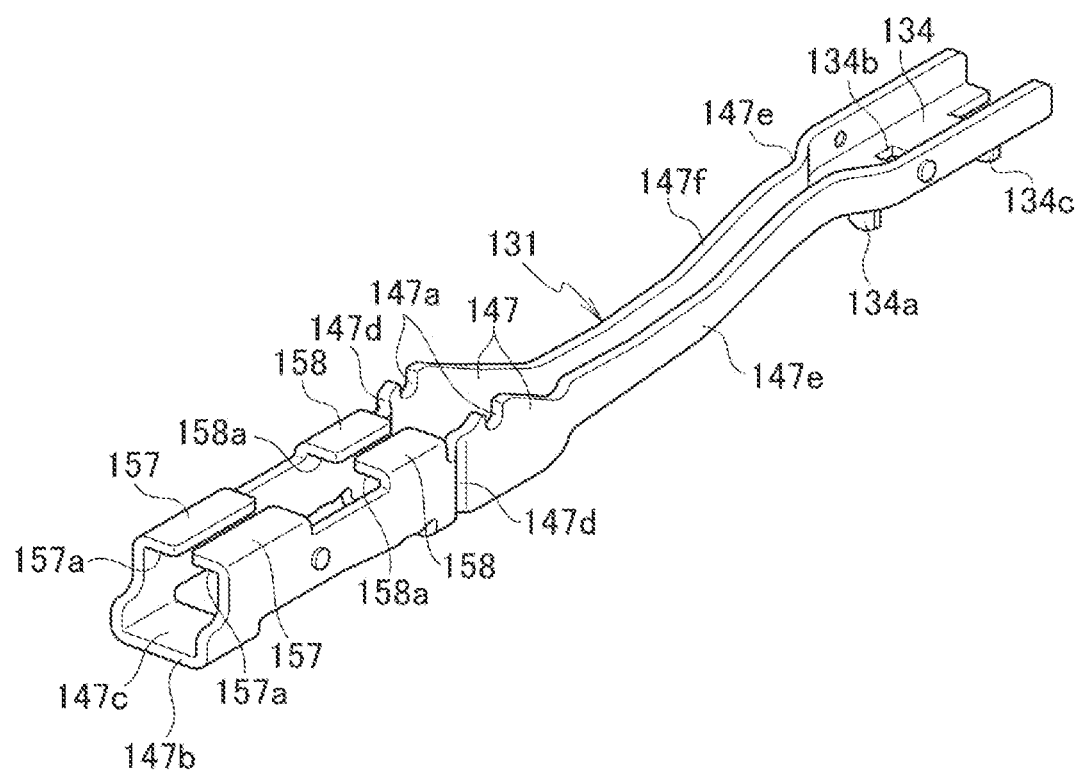
FIG. 7 is a perspective view of a lever member.

As illustrated in FIG. 7, the lever member 131 includes left and right side walls 147 extending relative to the upper rail 105 in the longitudinal direction and facing each other with a predetermined clearance in the left-right direction, and a lower wall 134 connecting the lower ends of the left and right side walls 147 to each other in a region excluding the ends of the left and right side walls 147 on the front side.

Figure 13A:
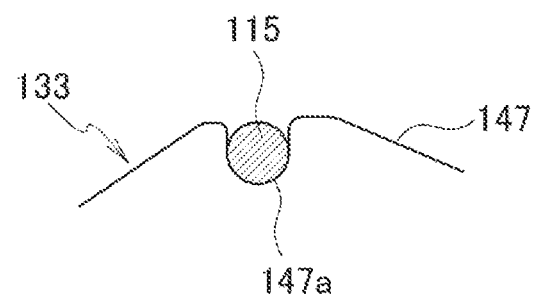
FIG. 13A is a side sectional view of an enlarged main portion of the seat sliding device illustrating one bearing.
Figure 13B:
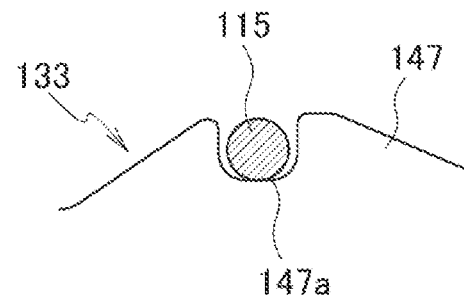
FIG. 13B is a side sectional view of the enlarged main portion of the seat sliding device illustrating the other bearing.

A pair of left and right recessed grooves 147*a*, which are bearings, are formed at the upper ends of the side walls 147 on the front side from the intermediate position of the lever member 131 in the front-rear direction. Of the pair of left and right recessed grooves 147*a*, the bottom surface of the right recessed groove 147*a* is formed as a semi-circular arc-shaped surface with a radius slightly larger than the outer diameter of the shaft member 115 (see FIG. 13A), and the bottom surface of the left recessed groove 147*a* is formed as a flat surface extending in the vehicle front-rear direction (see FIG. 13B). The recessed grooves 147*a* engage with the shaft member 115 from below, and the lever member 131 is biased upward at the respective front and rear ends so as to maintain a state in which the recessed grooves 147*a* engage with the shaft member 115, and thus the bottom surfaces of the left and right pair of recessed grooves 147*a* are in contact with the shaft member 115 at one point in the up-down direction. Here, the radius of the aforementioned arc-shaped surface is set slightly larger than the outer diameter of the shaft member 115 to the extent that the engagement with the shaft member 115 does not become a pressed fit due to variations in dimensions.

Although not illustrated, in another embodiment, one bearing of the pair of left and right bearings may be formed as a round hole and the other bearing may be formed as an elongated hole extending in the vehicle front-rear direction.

At the lower wall 134 at the rear end of the lever member 131, a front protrusion 134*a* protruding downward from the lower wall 134, a positioning hole 134*b*, and a rear protrusion 134*c* protruding downward from the lower wall 134 are provided in this order from the front to the rear. The front protrusion 134*a* and the rear protrusion 134*c* are formed by cutting and raising the lower wall 134 downward.

Figure 9:
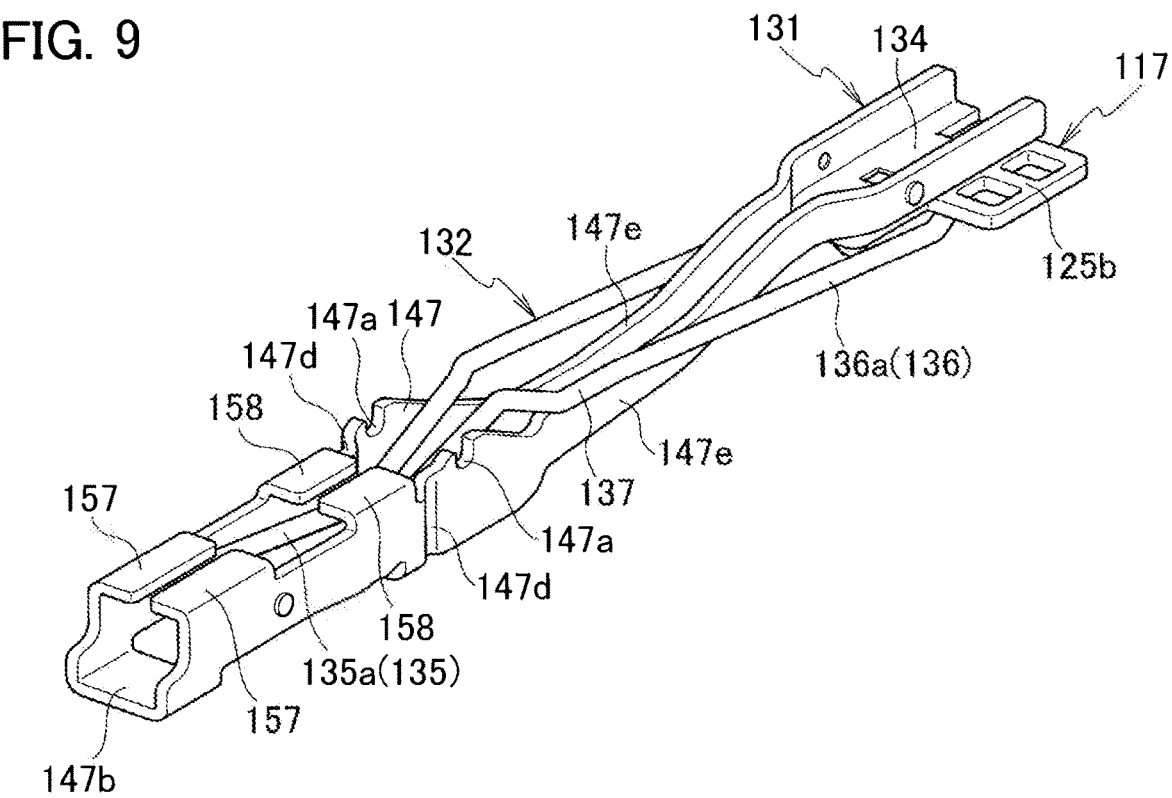
FIG. 9 is a perspective view illustrating a state in which the biasing member is assembled to the lever member.
Figure 10:
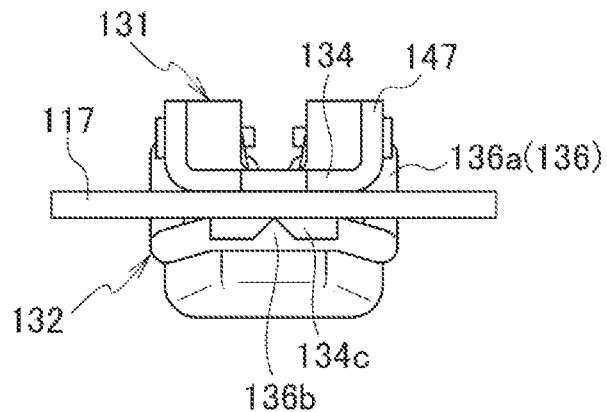
FIG. 10 is a rear view of the lever member and the biasing member as viewed from the rear.

The front protrusion 134*a* and the rear protrusion 134*c* of the lever member 131 are inserted into the front fixing hole 117*a* and the rear fixing hole 117*d* of the lock member 117 respectively, and the upper protrusion 117*b* of the lock member 117 is inserted into the positioning hole 134*b* of the lever member 131 by press fitting. In this state, the lock member 117 is fixed to the rear end of the lever member 131 by staking the front protrusion 134*a* and the rear protrusion 134*c* (see FIGS. 9 and 10).

The lower ends of the front ends of the lever member 131 are connected to each other by a front lower wall 147*b* as a front lower support portion extending in the left-right direction facing toward the lower end on the opposite side. The upper surface of the front lower wall 147*b* forms a front lower support surface 147*c*. At the upper ends of the front ends of both side walls 147, front upper protrusions 157 are formed as front upper support portions extending in the left-right direction from both side walls 147 in such a way to bend toward the opposite sides facing each other. The tips of the left and right front upper protrusions 157 are separated from each other, and a gap is formed therebetween. The lower surfaces of the front upper protrusions 157 form front upper support surfaces 157*a*.

At the upper portions of both side walls 147, which are positioned rearward of the front upper protrusions 157 and forward of the recessed grooves 147*a*, rear upper protrusions 158 are formed as rear upper support portions extending in the left-right direction from both side walls 147 in such a way to bend toward the opposite sides facing each other. The lower surfaces of the rear upper protrusions 158 form rear upper support surfaces 158*a*. That is, a pair of upper support surfaces (front upper support surface 157*a* and rear upper support surface 158*a*) facing an upper surface 169*b*1 of the rear end of the operation member 133 are provided at the front end of the lever member 131. Here, the pair of upper support surfaces are provided with a clearance between the pair of upper support surfaces in the vehicle front-rear direction. Further, the front lower support surface 147*c* facing a lower surface 169*b*3 of the rear end of the operation member 133 is provided below the front upper support surfaces 157*a* at the front end of the lever member 131.

The front end of the lever member 131 is formed into a substantially square cross-section by the front upper support surfaces 157*a*, the front lower support surface 147*c* and both side walls 147, and the rear end of the operation member 133 is inserted inside the front end of the lever member 131.

In addition, movement prevention protrusions 147*d* protruding from both side walls 147 toward the sides facing each other are formed on both side walls 147 which are positioned rearward of the rear upper protrusions 158 and forward of the recessed grooves 147*a*. The movement prevention protrusions 147*d* are formed by causing a part of both side walls 147 to protrude inward.

In addition, a pair of left and right recesses 147*e* are provided on both side walls 147 which are positioned rearward of the recessed grooves 147*a* and forward of the front protrusion 134*a*, and a narrow portion 147*f* is formed having a clearance between both side walls 147 that is narrower than the clearance between the front ends and the clearance between the rear ends.

Figure 8:
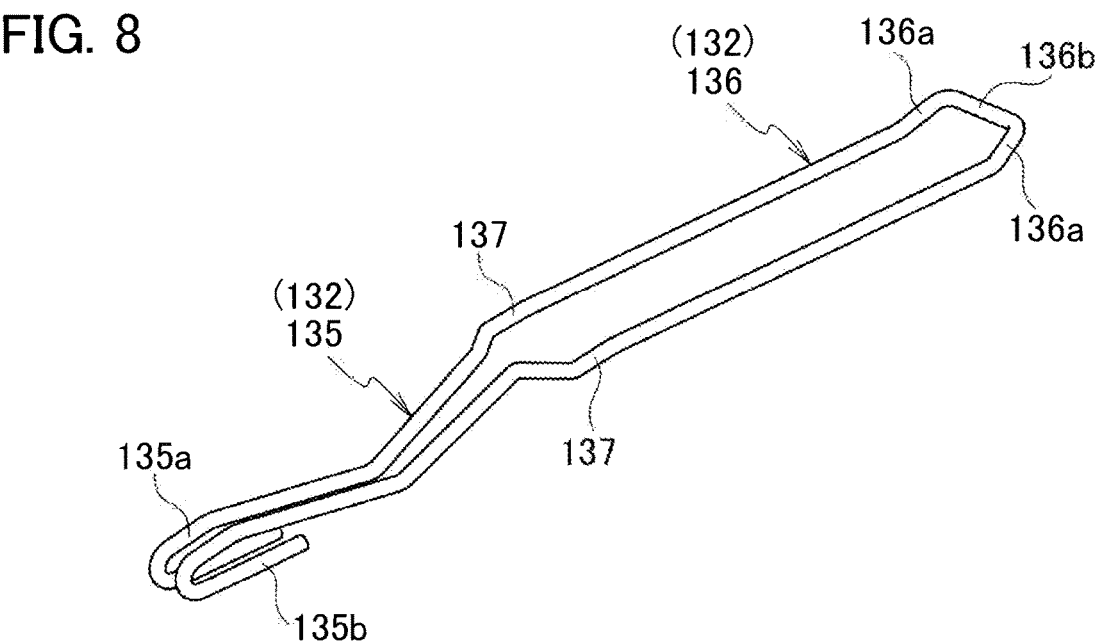
FIG. 8 is a perspective view of a biasing member.

As illustrated in FIG. 8, the biasing member 132 is formed into a pair of elongated bars extending approximately parallel to each other, and extends in the front-rear direction along the upper side walls 105*b* of the upper rail 105 inside the upper rail 105. The biasing member 132 has a front biasing member 135 including front acting portions 135*a* which come in contact with the front end of the lever member 131 to bias the front end of the lever member 131 upward. In addition, the biasing member 132 has a rear biasing member 136 including rear acting portions 136*a* which come in contact with the rear end of the lever member 131 to bias the rear end of the lever member 131 upward. In addition, the biasing member 132 has intermediate support portions 137 which are formed between the front acting portions 135*a* and the rear acting portions 136*a* and engaged with the engaging portions 105*g* provided on the upper side walls 105*b* of the upper rail 105.

The rear biasing member 136 has a connecting portion 136*b* extending from the intermediate support portions 137 to the rear acting portions 136*a* along the left and right upper side walls 105*b*, and the pair of left and right rear acting portions 136*a* are connected to each other by the connecting portion 136*b* positioned at the rear end of the rear biasing member 136. Accordingly, the rear biasing member 136 (biasing member 132) is formed into an approximately U-shape in plan view. The connecting portion 136*b* of the rear biasing member 136 comes in contact with the lower surface of the lock member 117 from below, and thus the rear side acting portions 136*a* (connecting portion 136*b*) bias the lock member 117 upward (in the lock position direction). The connecting portion 136*b* of the rear biasing member 136 is positioned between the lower protrusion 117*c* and the rear protrusion 134*c*, thereby defining the range of movement of the rear biasing member 136 (biasing member 132) in the front-rear direction.

The rear end of the rear biasing member 136 (rear acting portions 136*a*, connecting portion 136*b*) is positioned below the lever member 131 and the lock member 117, and the intermediate portions (intermediate support portions 137) extend upward of the lever member 131 through the recesses 147*e* (between the narrow portion 147*f* and the upper side wall 105*b*).

Meanwhile, the front biasing member 135 has retaining portions 135*b* at the front ends. The retaining portions 135*b* extend from the intermediate support portions 137 to the front acting portions 135*a* along both the left and right upper side walls 105*b* and are folded downward to be engaged with a engaging hole 133*a* provided in the lower surface of the operation member 133. The front acting portions 135*a* of the front biasing member 135 come in contact with the operation member 133 from below, and the front acting portions 135*a* bias the front end of the lever member 131 upward via the operation member 133.

The front biasing member 135 extends forward between both side walls 147 with the rear ends (intermediate support portions 137) positioned above the lever member 131 and the front ends (front acting portions 135*a*) bent inward so as to approach each other.

The front biasing member 135 and the rear biasing member 136 are integrally formed (one member).

As illustrated in FIG. 1, the operation member 133 includes a pair of left and right arms 167 provided respectively for the pair of left and right rail bodies 106, and a grip 168 extending in the vehicle width direction to connect the pair of left and right arms 167 to each other. The pair of left and right arms 167 extend in the front-rear direction and have rear ends which are inserted respectively into the left and right upper rails 105 from the front ends. The grip 168 is gripped by an occupant when the occupant operates the operation member 133.

As illustrated in FIG. 14, the rear end of the arm 167 is inserted between the left and right side walls 147 of the lever member 131. The arm 167 is formed of a cylindrical member as a whole including the grip 168, and the rear end of the arm 167 described above is a connection end 169 serving as a rear connecting portion formed by press molding of the cylindrical member.

Figure 11A:
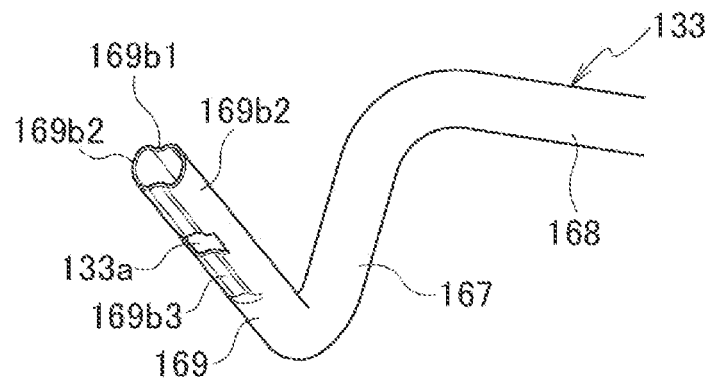
FIG. 11A is a perspective view of a portion of the operation member as viewed from below.
Figure 11B:
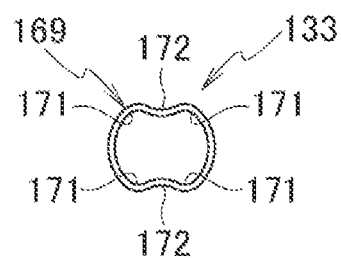
FIG. 11B is a rear view of a rear end of the operation member as viewed from the rear.
Figure 12:
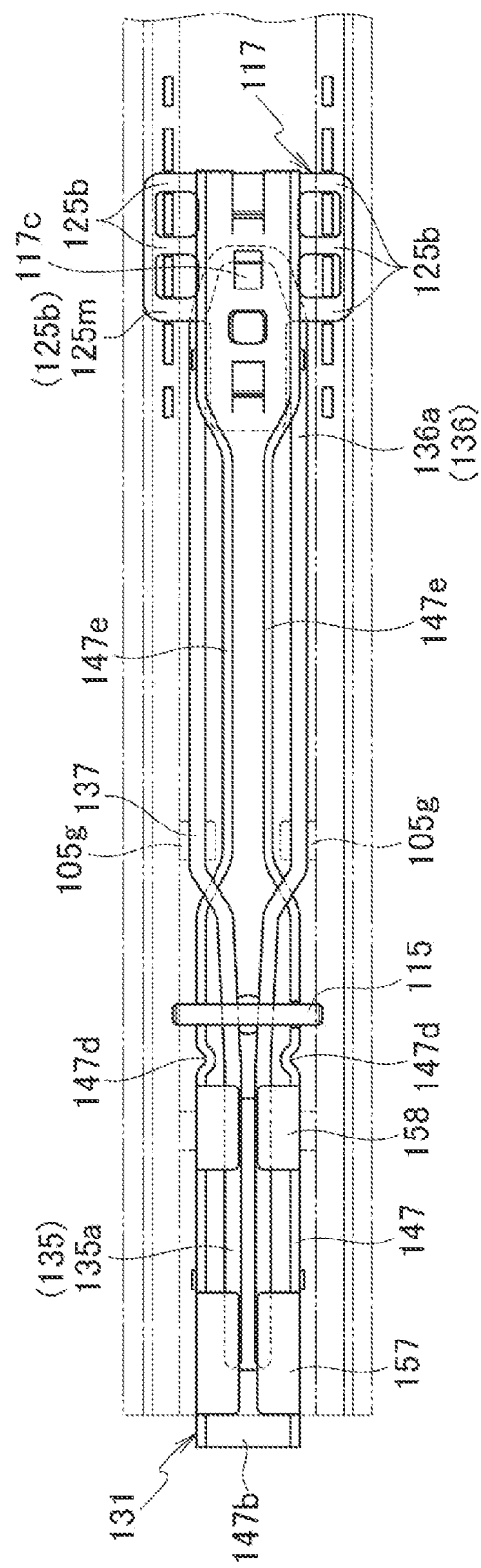
FIG. 12 is a plan view of the lever member and the biasing member as viewed from above.

As illustrated in FIGS. 11A and 11B, the connection end 169 includes the upper surface 169*b*1, the side surfaces 169*b*2 extending downward from both left and right ends of the upper surface 169*b*1, and a lower surface 169*b*3 provided from the lower ends of the left and right side surfaces 169*b*2 toward the left and right inner sides. A pair of left and right recessed portions 171 extending in the vehicle front-rear direction are provided in the upper inner surface and the lower inner surface of the connection end 169. In addition, the engaging hole 133*a* is formed in the lower surface 169*b*3 of the connection end 169 so as to straddle the left and right recessed portions 171 and 171.

The connection end 169 of the operation member 133 has protrusions 172 above and below where the intermediate portions of the cylindrical member in the left-right direction protrude inward, and the pair of front ends of the biasing member 132 are disposed at portions where the clearance in the connection end 169 in the up-down direction is large (recessed portions 171).

In a state before the operation member 133 is attached to the lever member 131, the front end of the biasing member 132 (abutment portion) is configured to come in contact with the front upper support surfaces 157*a* of the lever member 131. In a state in which the operation member 133 is attached to the lever member 131 (see FIG. 14), the front end of the biasing member 132 (abutment portion) is inserted inside the operation member 133 and comes in contact with the lower surface of the operation member 133 (the inner surface of the upper surface 169b1) from below, thereby biasing the operation member 133 upward.

As illustrated in FIG. 14, the lever member 131 is turnably supported at the upper side walls 105b of the upper rail 105 by the shaft member 115, and the biasing member 132 is engaged with the engaging portion 105g in such a way as to prevent the biasing member 132 from moving downward. In addition, on the left and right upper side walls 105b of the upper rail 105, a rear lower protrusion 148 is formed at a position forward of the bearing hole 105f in the vehicle front-rear direction as a rear lower support portion protruding from both upper side walls 105b in such a way as to bend toward the sides facing each other. The rear lower protrusion 148 is formed by cutting and raising the upper side walls 105b toward the inner side.

The biasing member 132 engages with the lower surface of the rear end of the operation member 133 (the inner surface of the upper surface 169b1) from below at a position below the front upper support surface 157a, thereby biasing the operation member 133 upward. Thus, the upper surface 169b1 of the operation member 133 comes into contact with the pair of upper support surfaces (front upper support surface 157a and rear upper support surface 158a). At this time, a clearance C1 is provided in the up-down direction between the front lower support surface 147c provided in the lever member 131 and the lower surface 169b3 of the rear end of the operation member 133, and a clearance C2 is provided in the up-down direction between the rear lower support surface 148a provided in the upper rail 105 and the lower surface 169b3 of the rear end of the operation member 133.

In this regard, as illustrated in FIG. 14, regarding the length L1 between the contact point between the engaging portion 105g and the intermediate support portion 137 of the biasing member 132 (support point P0) and the contact point between the front end of the lever member 131 and the front acting portion 135a of the biasing member 132 (front acting point P1), and regarding the length L2 between the contact point between the engaging portion 105g and the intermediate support portion 137 of the biasing member 132 (support point P0) and the contact point between the rear end of the lever member 131 and the rear acting portion 136a of the biasing member 132 (rear acting point P2), the length L1 is shorter than the length L2 (L1<L2).

The rotational moment at the support point P0 is [F1*L1=F2*L2] from the moment balance [M0=F1*L1−F2*L2=0]. Here, the length L1 between the support point P0 and the front acting point P1 is set to be shorter than the length L2 between the support point P0 and the rear acting point P2 (L1<L2). This makes it possible for the force F1 acting on the front acting point P1 (biasing force) to become larger than the force F2 acting on the rear acting point P2 (biasing force) (F1>F2).

That is, the force F1 by which the biasing member 132 (front biasing member 135) biases the front end of the lever member 131 in the lock release direction is set to be larger than the force F2 by which the biasing member 132 (rear biasing member 136) biases the rear end of the lever member 131 (lock member 117) in the lock direction.

Here, the length between the turning center Q of the lever member 131 and the contact point between the front end of the lever member 131 and the front acting portion 135a of the biasing member 132 (front acting point P1) is defined as "L3". In addition, the length between the turning center Q of the lever member 131 and the contact point between the rear end of the lever member 131 and the rear acting portion 136a of the biasing member 132 (rear acting point P2) is defined as "L4". At this time, the lengths L3 and L4 described above are set such that the rotational moment on the rear-end side (Mb=F2*L4) is larger than the rotational moment on the front-end side (Ma=F1*L3) at the turning center Q of the lever member 131.

In the present embodiment, the length L3 is shorter than the length L1 (L1>L3) and the length L2 is shorter than the length L4 (L3<L1<L2<L4). This makes it possible for the rotational moment on the rear-end side (Mb=F2*L4) to become larger than the rotational moment on the front-end side (Ma=F1*L3) at the turning center Q of the lever member 131.

As a result, the rotational moment at the turning center Q of the lever member 131 acts as a biasing force that biases the rear end of the lever member 131 (lock member 117) in the lock direction.

Next, the operation of the seat sliding device 101 configured as described above will be described.

FIG. 14 illustrates a standby state in which the lock teeth 125b of the lock member 117 engage with the locking grooves 127 of the lower rail 103 and are locked thereto, in the lock position (a non-operating state in which the operation member 133 is not operated). In this state, the operation member 133 is pressed against the pair of upper support surfaces (front upper support surface 157a and rear upper support surface 158a) by the front end of the biasing member 132 (abutment portion). The pressing force (biasing force) of the front end of the biasing member 132 is larger than a force that causes the operation member 133 to move downward due to its own weight. Meanwhile, the rotational moment for rotationally biasing the lock member 117 in the lock release position direction is smaller than the rotational moment in the lock position direction generated by the pressing force (biasing force) at the rear end of the biasing member 132, and thus the standby state described above is maintained.

Figure 15:
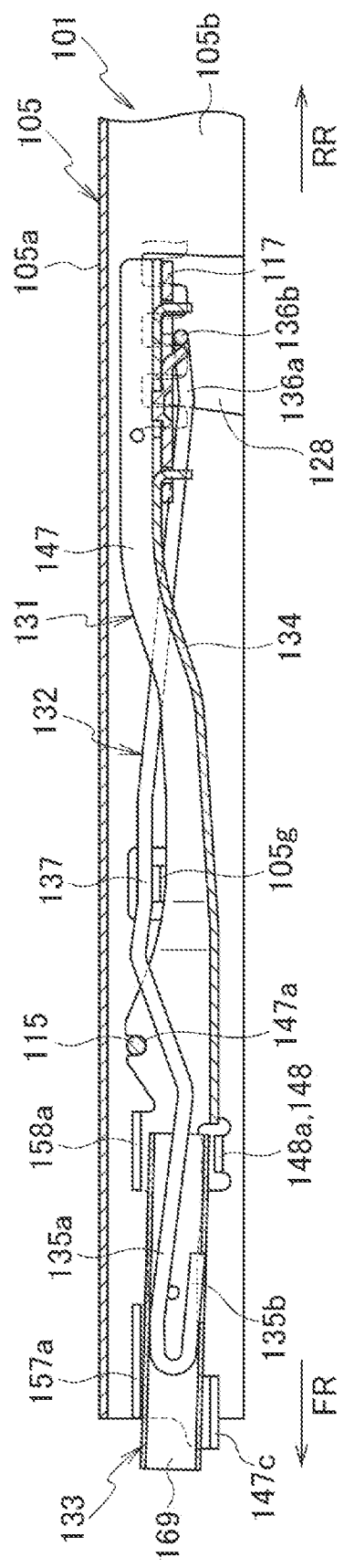
FIG. 15 is a side sectional view of the enlarged main portion of the seat sliding device illustrating a state in which the operation member operates in the lock release direction.

From the state illustrated in FIG. 14, when the occupant lifts the grip 168 of the operation member 133, the operation member 133 turns around the contact point between the front upper support surface 157a and the upper surface 169b1 of the operation member 133 as a fulcrum, and the rear end of the operation member 133 moves downward by pushing down the front end of the biasing member 132 (abutment portion). In this state, when the grip 168 of the operation member 133 is further lifted, the lower surface 169b3 of the rear end of the operation member 133 comes into contact with the rear lower support surface 148a provided in the upper rail 105, and the operation member 133 turns around the contact point between the rear lower support surface 148a and the lower surface 169b3 of the rear end of the operation member 133 as a fulcrum. As a result, the upper surface 169b1 of the operation member 133 turns and lifts the front upper support surface 157a of the lever member 131 upward, and the lever member 131 turns the lock portion of the lock member 117 in the lock release position direction (see FIG. 15).

Accordingly, the lever member 131 swings and rotates clockwise in FIG. 14 around the shaft member 115. At this time, the lever member 131 pushes the lock member 117 downward due to the swinging rotation, and the biasing member 132 (rear biasing member 136) elastically deforms downward. As a result, the lock teeth 125b come away from the lock grooves 127 of the lower rail 103, and thus the lock is released (lock release state). When the lock is released, it is possible to move the seat (not illustrated) back and forth with respect to the floor surface of the vehicle of the lower rail 103 side together with the upper rail 105, and secure the seat position desired by the occupant.

When the occupant releases his or her hand from the operation member 133 in a state where the seat position is determined, the biasing member 132 (rear biasing member 136) presses the lock member 117 upward, and the lever member 131 swings and rotates to return to the standby state illustrated in FIG. 14. At this time, the lever member 131 swings and rotates counterclockwise in FIG. 14 around the shaft member 115.

Figure 16:
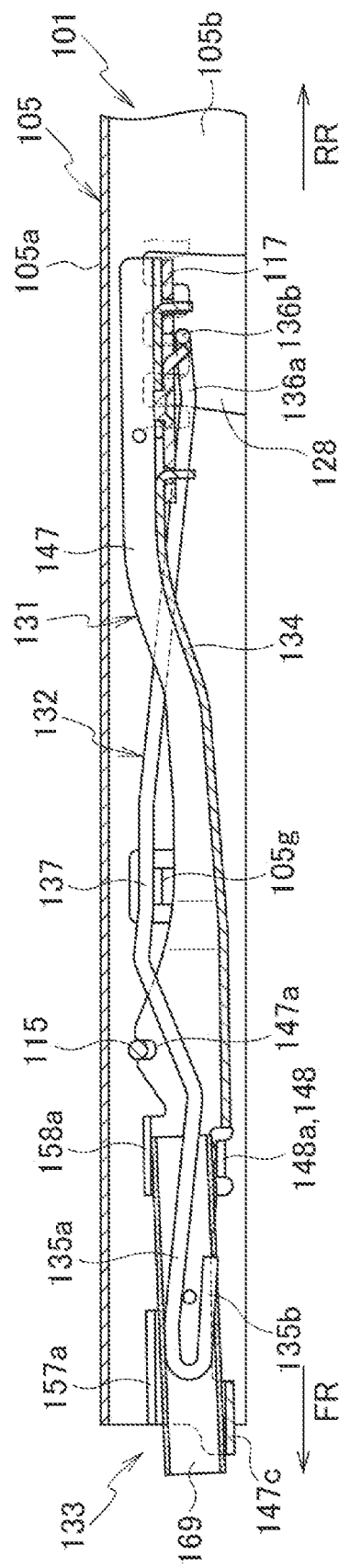
FIG. 16 is a side sectional view of the enlarged main portion of the seat sliding device illustrating a state in which a load in the anti-lock release direction acts on the operation member.
Figure 17:
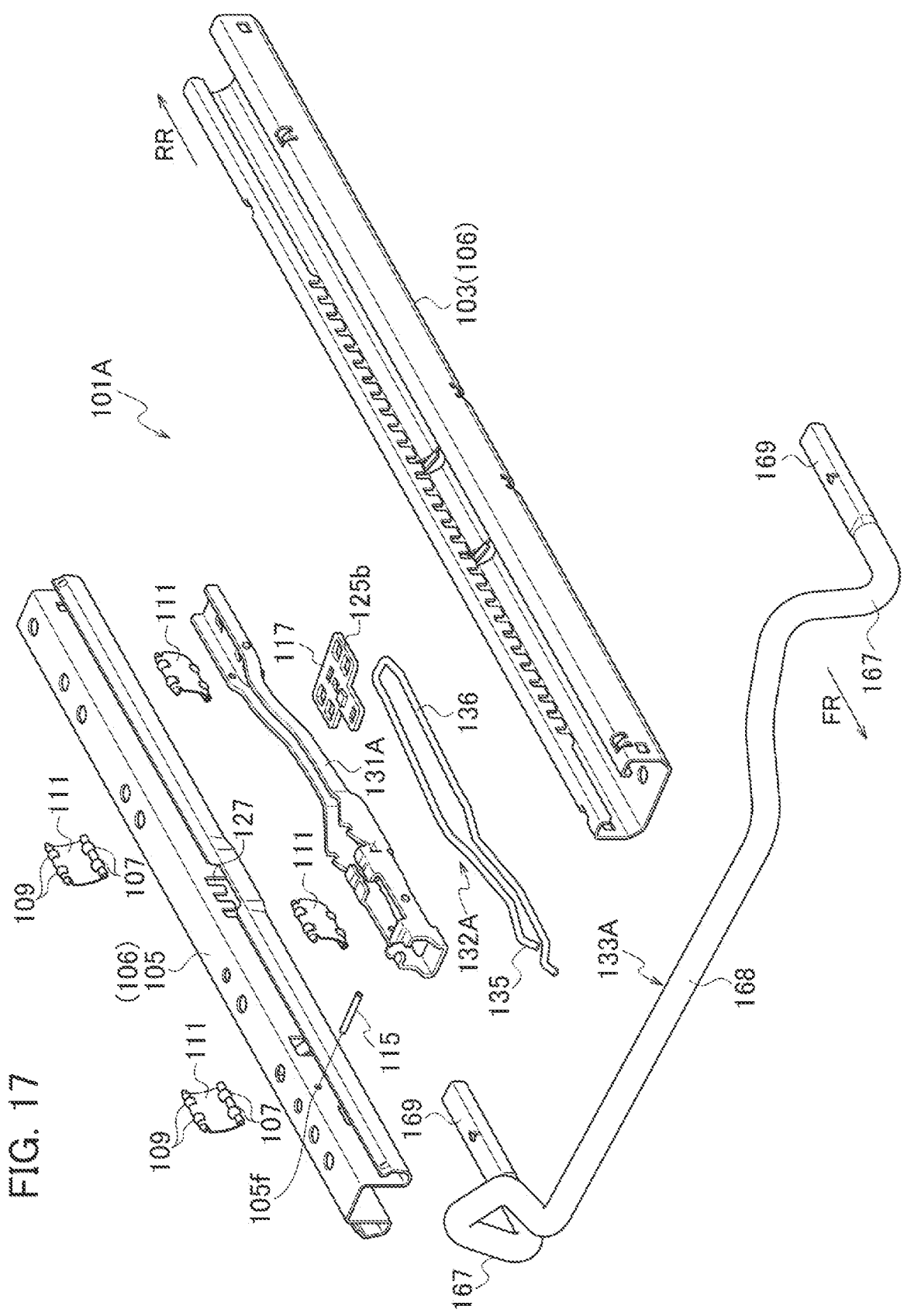
FIG. 17 is an exploded perspective view of a seat sliding device according to a second embodiment of the present invention.

In the state illustrated in FIG. 14, when a load is applied to the operation member 133 in the anti-lock release direction (downward), the operation member 133 turns around the contact point between the rear upper support surface 158a and the upper surface 169b1 of the operation member 133 as a fulcrum, and the operation member 133 can move downward by the amount of the clearance C1 between the lower surface 169b3 of the operation member 133 and the front lower support surface 147c (see FIG. 16). At this time, the lever member 131 rotates downward around the interlock position of the main lock tooth 125m, and the lower surface of the front end side of both side walls 147 comes in contact with the rear lower support surface 148a to prevent the lever member 131 from moving downward, thereby preventing the recessed grooves 147a from coming away from the shaft member 115.

The operational effect of the seat sliding device 101 according to the present embodiment will be described below.

(1) A seat sliding device 101 includes a lower rail 103 extending in a vehicle front-rear direction, an upper rail 105 configured to move relative to the lower rail 103 in a longitudinal direction, a lever member 131 turnably supported about an axis in a left-right direction with respect to the upper rail 105, a lock member 117 provided in a rear end of the lever member 131 and including lock portions (lock teeth 125b) configured to be movable between a lock position where the lock portions engage with locked portions (lock grooves 127) formed in the lower rail 103 and a lock release position where the lock portions come away from the locked portions, a biasing member 132 configured to bias the lock portions in a lock position direction, and an operation member 133 connected to a front end of the lever member 131. The biasing member 132 is formed of a bar-shaped member and includes a front acting portion 135a configured to come in contact with the front end of the lever member 131 to bias the front end of the lever member 131 upward, a rear acting portion 136a configured to come in contact with the rear end of the lever member 131 to bias the rear end of the lever member 131 upward, and an intermediate support portion 137 formed between the front acting portion 135a and the rear acting portion 136a and engaged with a engaging portion 105g formed in the upper rail 105. The engaging portion 105g is positioned rearward of a turning center of the lever member 131 (shaft member 115) and supports the intermediate support portion 137 in such a way as to prevent the intermediate support portion 137 from moving downward.

The contact point between the engaging portion 105g and the intermediate support portion 137 is defined as a support point P0, the contact point between the front end of the lever member 131 and the front acting portion 135a is defined as a front acting point P1, and the contact point between the rear end of the lever member 131 and the rear acting portion 136a is defined as a rear acting point P2. Further, the biasing force acting on the front acting point P1 is defined as a front biasing force F1, the biasing force acting on the rear acting point P2 is defined as a rear biasing force F2, the length between the support point P0 and the front acting point P1 is defined as a length L1, and the length between the support point P0 and the rear acting point P2 is defined as a length L2. The rotational moment at the support point P0 is [F1*L1=F2*L2] from the moment balance [M0=F1*L1−F2*L2=0].

Here, the turning center Q of the lever member 131 is set to the front side of the support point P0 in the vehicle front-rear direction. Accordingly, the length L3 between the turning center Q and the front acting point P1 is shorter than the aforementioned length L1 (L3<L1), the length L4 between the turning center Q and the rear acting point P2 is longer than the length L2 (L4>L2).

Accordingly, the moment on the front acting point P1 side (Ma=F1*L3) is smaller than the moment on the rear acting point P2 side (Mb=F2*F4). For this reason, regarding the moment at the turning center Q, the moment on the rear acting point P2 (Mb=F2*F4) side is large, which acts as a biasing force in the lock direction.

As a result, the front acting portion 135a and the rear acting portion 136a of the biasing member 132 come in contact with the lever member 131 from below, and the intermediate portion of the biasing member 132 is elastically deformed upward and engaged with the engaging portion 105g of the upper rail 105, and thus it is possible to simplify the shape of the biasing member 132 and to improve the ease of assembling the biasing member 132 to the upper rail 105.

(2) The length L1 between the contact point between the engaging portion 105g and the intermediate support portion 137 of the biasing member 132 (support point P0) and the contact point between the front end of the lever member 131 and the front acting portion 135a of the biasing member 132 (front acting point P1) is shorter than the length L2 between the contact point between the engaging portion 105g and the intermediate support portion 137 of the biasing member 132 (support point P0) and the contact point between the rear end of the lever member 131 and the rear acting portion 136a of the biasing member 132 (rear acting point P2).

The rotational moment at the support point P0 is [F1*L1=F2*L2] from the moment balance. Here, the length L1 is set to be shorter than the length L2 (L1<L2), and thus [L3<L1<L2<L4] is obtained and the biasing force [F1>F2] is obtained.

As a result, a rotational moment in the lock direction is generated at the rear end of the lever member 131, and an upward biasing force of the biasing member 132 can be enhanced at the front end of the lever member 131.

(3) The lever member 131 includes a pair of left and right side walls 147 extending relative to the upper rail 105 in a longitudinal direction and facing each other with a predetermined clearance in a left-right direction, a front upper support portion (front upper protrusion 157) provided at an upper end of a front end of at least one side wall 147 and protruding in the left-right direction toward the opposite side wall 147, and a front lower support portion (front lower wall 147b) provided at a lower end of a front end of at least one of the side walls 147 and protruding in the left-right direction toward the opposite side wall 147. The front end of the lever member 131 is formed into a substantially square cross-section by the pair of left and right side walls 147 and the front upper support portion and the front lower support portion, and the rear end of the operation member 133 is inserted inside the front end of the lever member 131. The biasing member 132 includes a rear biasing portion (rear biasing member 136) extending from the intermediate support portion 137 to the rear acting portion 136*a*, coming into contact with the rear end of the lever member 131 from below, and biasing the rear end of the lever member 131 upward, and a front biasing portion (front biasing member 135) extending from the intermediate support portion 137 to the front acting portion 135*a*, coming into contact with the rear end of the operation member 133 from below, and biasing the front end of the lever member 131 upward via the operation member 133.

The front acting portion 135*a* of the biasing member 132 biases the front end of the lever member 131 upward via the operation member 133, and a sufficient biasing force can be secured to bias the operation member 133. In addition, it is possible to suppress rattling between the operation member 133 and the lever member 131.

(4) The pair of left and right side walls 147 of the lever member 131 include a pair of recesses 147*e* positioned between a turning center of the lever member 131 (shaft member 115) and the lock member 117 in the vehicle front-rear direction and narrowing a clearance between the pair of left and right side walls 147. The rear acting portion 136*a* of the biasing member 132 is positioned below the lever member 131, an intermediate portion in the biasing member 132 between the rear acting portion 136*a* and the front acting portion 135*a* extends upward of the lever member 131 through the recesses 147*e*, and the front acting portion 135*a* of the biasing member 132 is bent inward in the left-right direction and extends forward between the pair of left and right side walls 147 of the lever member 131.

In a state before the operation member 133 is attached to the lever member 131, the biasing member 132 can be temporarily held by its own elasticity because the front end comes in contact with the lower surface of the front upper support portions (front upper protrusions 157) positioned on the upper end sides of the side walls 147, the rear end comes in contact with the lower surface of the lock member 117, and the intermediate portion comes in contact with the upper surfaces of the side walls 147 extending relative to the recesses 147*e* in the left-right direction.

For this reason, in a state in which the lever member 131 and the biasing member 132 are temporarily assembled, after the lever member 131 and the biasing member 132 are turnably disposed on the upper rail 105, the intermediate portion of the biasing member 132 only needs to be moved in such a way as to be attached to the engaging portion 105*g* of the upper rail 105, which results in good ease of assembly.

Further, the attachment of the biasing member 132 described above can be performed merely by inserting a jig through the recesses 147*e* and pushing the intermediate portion of the biasing member 132 downward, which results in extremely good operability.

(5) The upper rail 105 includes a shaft member 115 disposed in such a way as to straddle both left and right side walls of the upper rail 105 (left and right upper side walls 105*b*), and the lever member 131 includes recessed grooves 147*a* opening upward and provided at the upper ends of the pair of left and right side walls 147 extending relative to the upper rail 105 in the longitudinal direction. The recessed grooves 147*a* engage with the shaft member 115 from below, and the front end and the rear end of the lever member 131 are biased upward by the biasing member 132 so as to maintain a state in which the recessed grooves 147*a* engage with the shaft member 115, and the lever member 131 is turnably supported with respect to the upper rail 105.

In a state in which the shaft member 115 is attached to the upper rail 105, the recessed grooves 147*a* of the lever member 131 engage with the shaft member 115 from below, and the recessed grooves 147*a* are biased upward so as not to come away from the shaft member 115, merely by attaching the intermediate portion of the biasing member 132 to the engaging portion 105*g* in this state, which results in good ease of assembly.

Second Embodiment

FIGS. 17 to 25 illustrate a seat sliding device 101A according to a second embodiment of the present invention.

Hereafter, the differences in shape, structure, etc. from the first embodiment will be mainly described.

Figure 18:
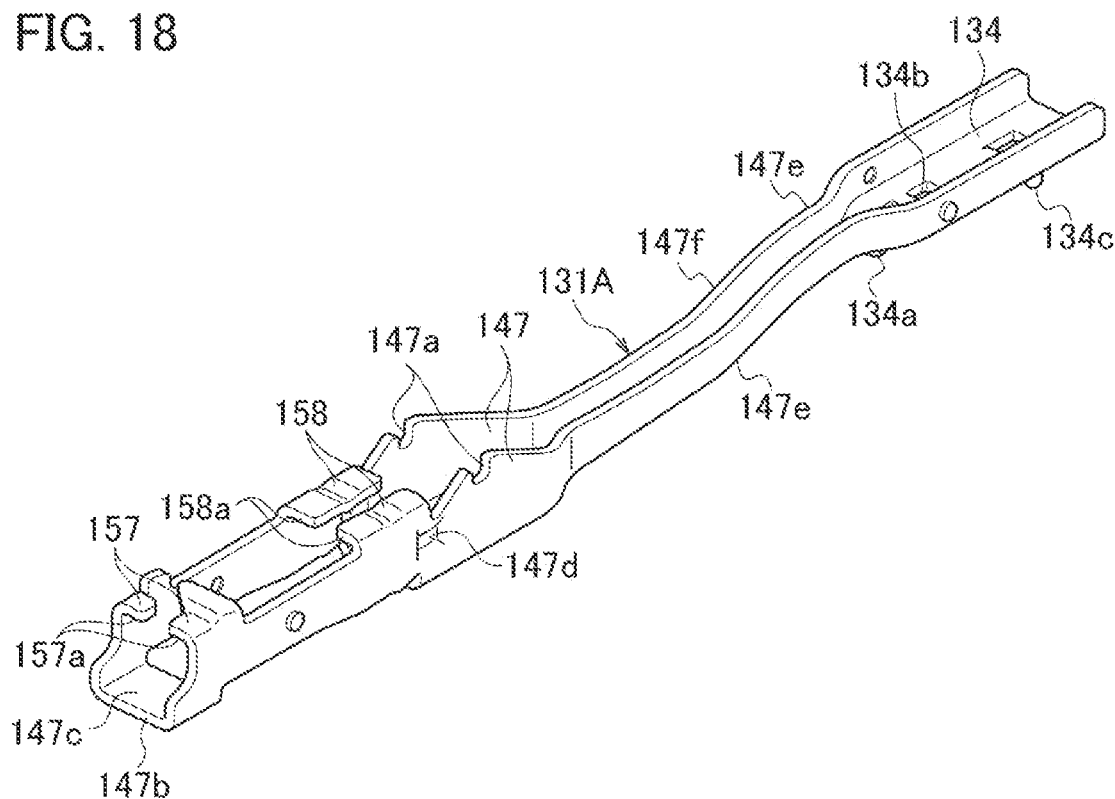
FIG. 18 is a perspective view of a lever member.

As illustrated in FIG. 18, the lower ends of the front ends of a lever member 131A are connected to each other by a front lower wall 147*b* as a front lower support portion extending in the left-right direction facing toward the lower end on the opposite side. The upper surface of the front lower wall 147*b* forms a front lower support surface 147*c*. At the upper ends of the front ends of both side walls 147, front upper protrusions 157 are formed as front upper support portions extending in the left-right direction from both side walls 147 in such a way to bend toward the opposite sides facing each other. The tips of the left and right front upper protrusions 157 are separated from each other, and a gap is formed therebetween. The lower surfaces of the front upper protrusions 157 form front upper support surfaces 157*a*.

At the upper portions of both side walls 147, which are positioned rearward of the front upper protrusions 157 and forward of the recessed grooves 147*a*, rear upper protrusions 158 are formed as rear upper support portions extending in the left-right direction from both side walls 147 in such a way to bend toward the opposite sides facing each other. The lower surfaces of the rear upper protrusions 158 form rear upper support surfaces 158*a*. That is, a pair of upper support surfaces (front upper support surface 157*a* and rear upper support surface 158*a*) facing an upper surface 169*b*1 of the rear end of an operation member 133A are provided at the front end of the lever member 131A. Here, the pair of upper support surfaces are provided with a clearance between the pair of upper support surfaces in the vehicle front-rear direction. Further, the front lower support surface 147*c* facing a lower surface 169*b*3 of the rear end of the operation member 133A is provided below the front upper support surfaces 157*a* at the front end of the lever member 131A.

The front end of the lever member 131A is formed into a substantially square cross-section by the front upper support surfaces 157*a*, the front lower support surface 147*c* and both side walls 147, and the rear end of the operation member 133A is inserted inside the front end of the lever member 131A.

In addition, movement prevention protrusions 147*d* protruding from both side walls 147 toward the sides facing each other are formed on both side walls 147 which are positioned rearward of the rear upper protrusions 158 and forward of the recessed grooves 147*a*. The movement prevention protrusions 147*d* are formed by causing a part of both side walls 147 to protrude inward.

Figure 19:
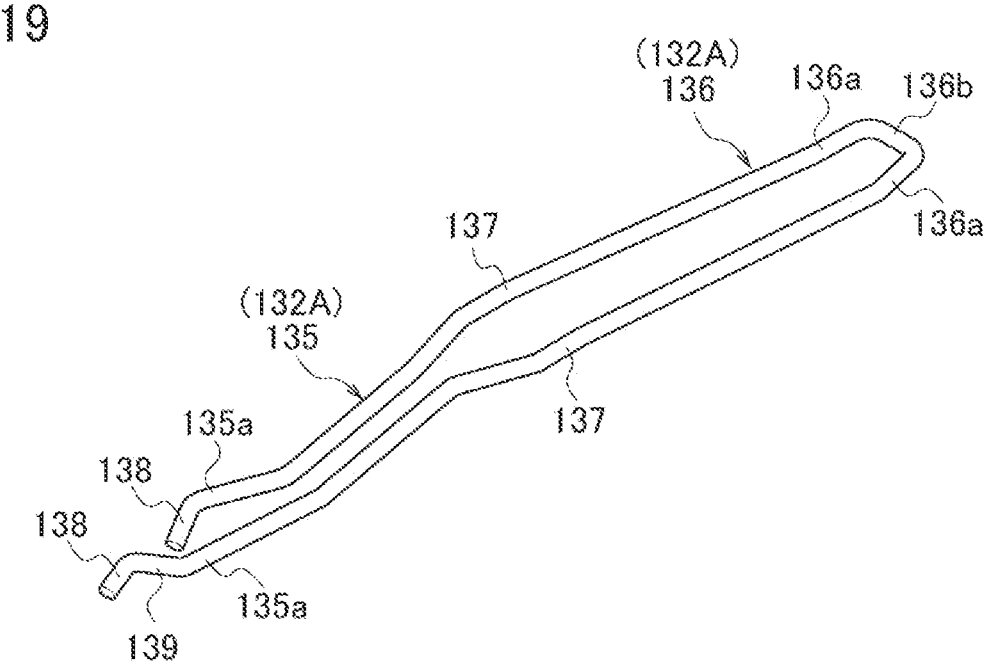
FIG. 19 is a perspective view of a biasing member.

As illustrated in FIG. 19, the biasing member 132A is formed into a pair of elongated bar-shaped members extending approximately parallel to each other, and extends in the front-rear direction along the upper side walls 105*b* of the upper rail 105 inside the upper rail 105. The biasing member 132A has a front biasing member 135 including a pair of left and right front acting portions 135*a* which come in contact with the front end of the lever member 131A to bias the front end of the lever member 131A upward. In addition, the biasing member 132A has a rear biasing member 136 including a pair of left and right rear acting portions 136a which come in contact with the rear end of the lever member 131A to bias the rear end of the lever member 131A upward. In addition, the biasing member 132A has a pair of left and right intermediate support portions 137 formed between the front acting portions 135a and the rear acting portions 136a and engaged with a pair of engaging portions 105g provided on the upper side walls 105b of the upper rail 105.

The rear biasing member 136 has a connecting portion 136b extending from the intermediate support portions 137 to the rear acting portions 136a along the left and right upper side walls 105b, and the pair of left and right rear acting portions 136a are connected to each other by the connecting portion 136b positioned at the rear end of the rear biasing member 136. Accordingly, the rear biasing member 136 (biasing member 132) is formed into an approximately U-shape in plan view. The connecting portion 136b of the rear biasing member 136 comes in contact with the lower surface of the lock member 117 from below, and thus the rear side acting portions 136a (connecting portion 136b) bias the lock member 117 upward (in the lock position direction). The connecting portion 136b of the rear biasing member 136 is positioned between the lower protrusion 117c and the rear protrusion 134c, thereby defining the range of movement of the rear biasing member 136 (biasing member 132A) in the front-rear direction.

The rear end of the rear biasing member 136 (the pair of rear acting portions 136a, connecting portion 136b) is positioned below the lever member 131 and the lock member 117, and the intermediate portions (the pair of intermediate support portions 137) extend upward of the lever member 131A through the recesses 147e.

Meanwhile, the front biasing member 135 extends from the intermediate support portions 137 to the front acting portions 135a along both the left and right upper side walls 105b. The pair of left and right front acting portions 135a of the biasing member 132A are biased by the elastic force of the biasing member 132A so as to be separated from each other in the left-right direction outward, and are also biased upward. The pair of left and right front acting portions 135a of the front biasing member 135 separately come in contact with the operation member 133A from below, and each of the front acting portions 135a biases the front end of the operation member 133A upward.

At the front portions (tips) of the respective front acting portions 135a, guide portions 138 inclined with respect to the vehicle front-rear direction are formed to guide the entry of the front acting portions 135a into the connection end 169 of the operation member 133A when the operation member 133A is attached to the lever member 131A. In addition, the pair of left and right front acting portions 135a are separately brought into contact with the front end of the lever member 131A at different positions with respect to the vehicle front-rear direction between the front upper support surface 157a and the rear upper support surface 158a. Further, of the pair of left and right front acting portions 135a, the front acting portion 135a disposed on the front side has an extension portion 139 extending in the left-right direction from one side to the other side in a flat portion 170a of the operation member 133 in which the extension portion 139 is disposed.

The front biasing member 135 extends forward between both side walls 147 with the rear ends (the pair of intermediate support portions 137) positioned above the lever member 131A and the front ends (the pair of front acting portions 135a, guide portion 138, and extension portion 139) bent inward so as to approach each other.

The front biasing member 135 and the rear biasing member 136 are integrally formed (one member).

Figure 23:
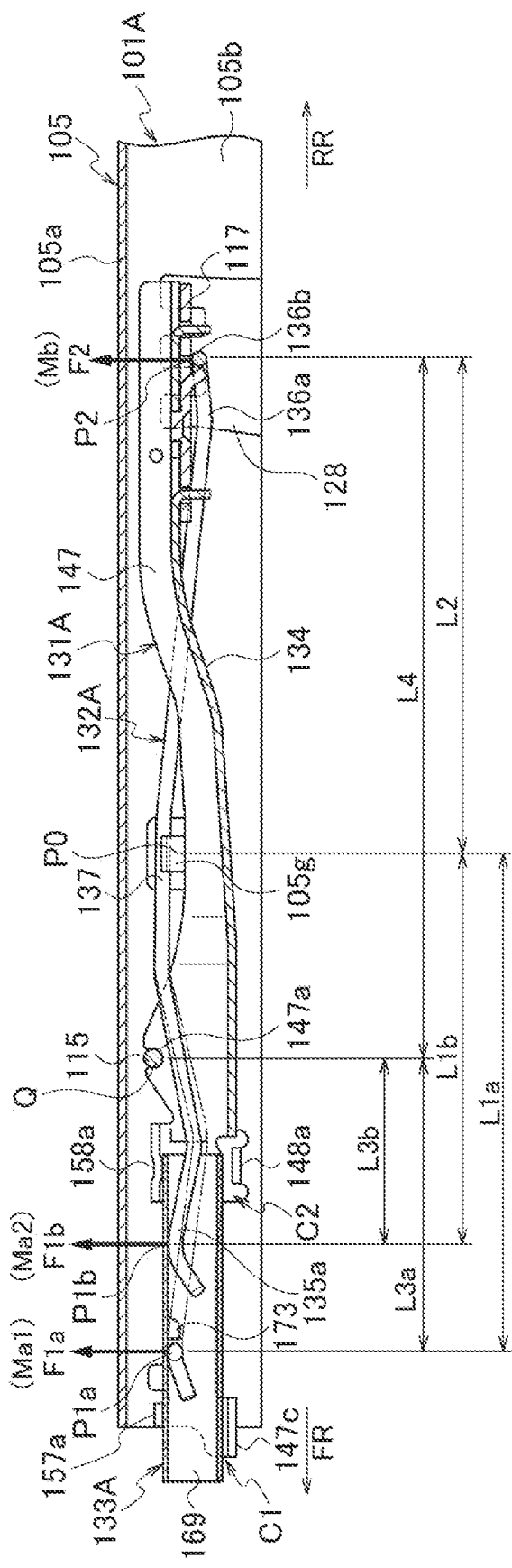
FIG. 23 is a side sectional view of an enlarged main portion of the seat sliding device.

As illustrated in FIG. 23, a rear end of the arm 167 of the operation member 133A is inserted between the left and right side walls 147 of the lever member 131. The arm 167 is formed of a cylindrical member as a whole including the grip 168, and the rear end of the arm 167 described above is the connection end 169 serving as a rear connecting portion formed by press molding of the cylindrical member.

Figure 20:
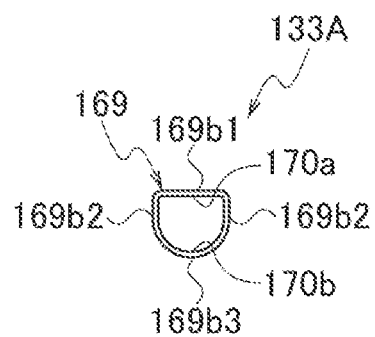
FIG. 20 is a rear view of a rear end of an operation member as viewed from the rear.
Figure 21:
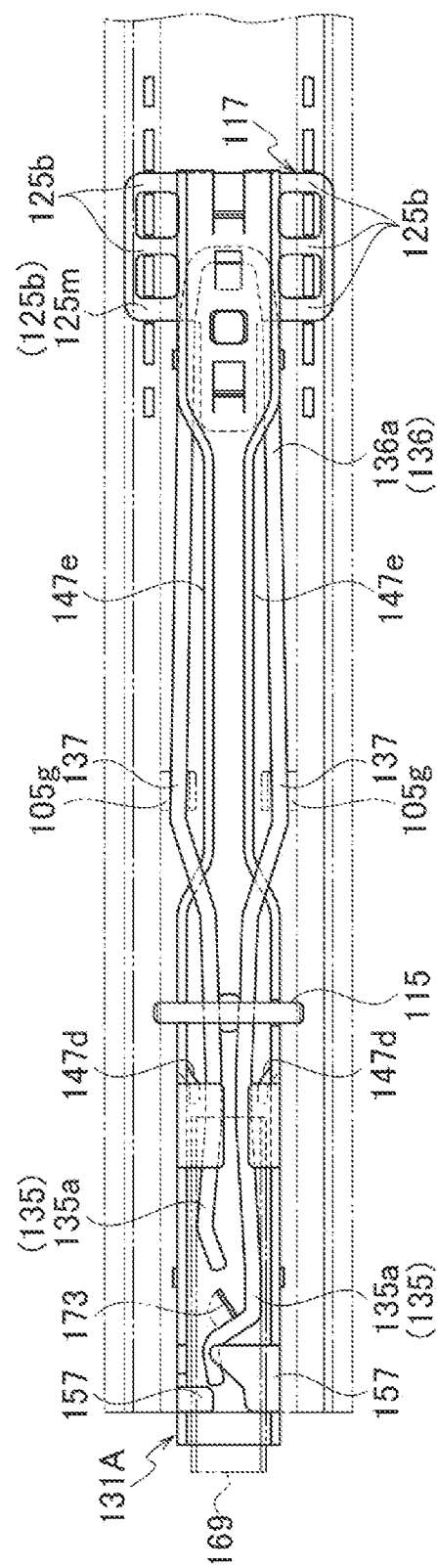
FIG. 21 is a plan view of the lever member and the biasing member as viewed from above.

As illustrated in FIG. 20, the connection end 169 includes the upper surface 169b1, the side surfaces 169b2 extending downward from both left and right ends of the upper surface 169b1, and the lower surface 169b3 provided at the lower ends of the left and right side surfaces 169b2. The connecting end 169 is formed into a substantially semicircular cross-section having a planar portion 170a on the upper portion and an arc-shaped portion 170b which is downwardly convex on the lower portion. The pair of left and right front acting portions 135a of the front biasing member 135 are disposed at both left and right ends of the planar portion 170a.

Figure 22A:
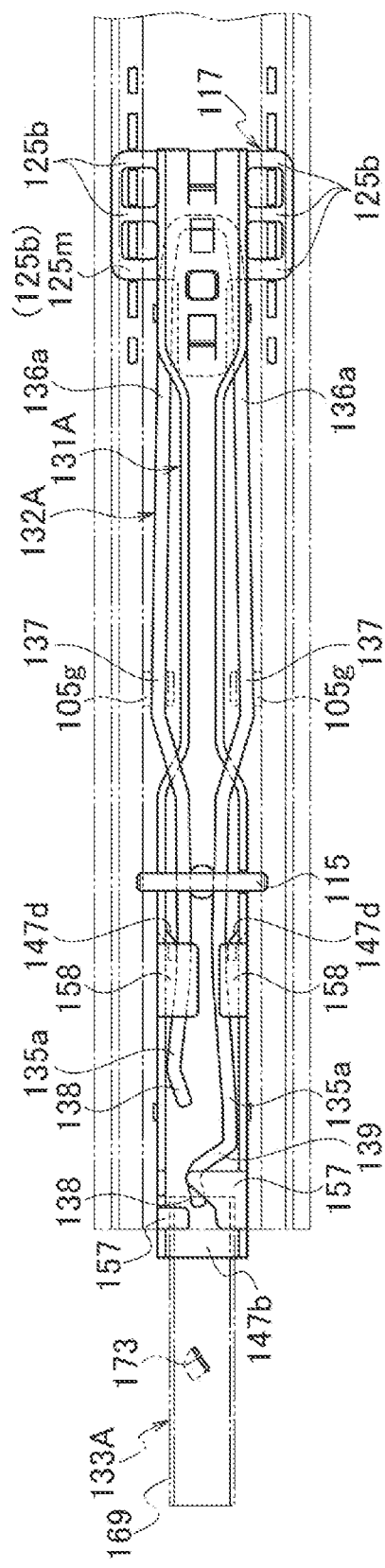
FIG. 22A is a plan view of the lever member as viewed from above before the operation member is attached.

In addition, as illustrated in FIGS. 22A and 22B, the upper inner surface of the connection end 169 is provided with an operation member side protrusion 173 protruding downward from the planar portion 170a. The operation member side protrusion 173 is formed by cutting and raising the planar portion 170a of the connecting end 169 toward the lower side.

An inclined surface 174 is formed at the rear of the operation member side protrusion 173 such that the extension portion 139 can straddle the operation member side protrusion 173 when the operation member 133A is attached to the lever member 131A. In addition, a engaging surface 175 is formed at the front portion of the operation member side protrusion 173 such that the operation member 133A is attached to the lever member 131A and the operation member 133A is prevented from moving forward in a state in which the extension portion 139 and the operation member side protrusion 173 are engaged with each other.

In a state before the operation member 133A is attached to the lever member 131A, the front end of the biasing member 132A (abutment portion) is configured to come in contact with the front upper support surface 157a or the rear upper support surface 158a of the lever member 131A. That is, the pair of left and right front acting portions 135a of the biasing member 132A come in contact with the front upper support surface 157a or the rear upper support surface 158a of the lever member 131A. In addition, a pair of left and right movement prevention protrusions 147d formed in the lever member 131A come in contact with the pair of left and right front acting portions 135a in the left-right direction. In a state in which the operation member 133A is attached to the lever member 131A (see FIG. 23), the front end of the biasing member 132A (abutment portion) comes in contact with the lower surface of the operation member 133A (the inner surface of the upper surface 169b1) from below, thereby biasing the operation member 133A upward.

Next, an example of the procedure for assembling the operation member 133A to the rail body 106 (lever member 131A) will be described.

(1) Before the Operation Member 133A is Attached

The pair of left and right front acting portions 135a are positioned at the corner portions of the upper support surfaces of the lever member 131A (front top support surface 157a, rear top support surface 158a) and the left and right side walls 147, and are inclined to face the center in the left-right direction and in the up-down direction, respectively, such that the respective guide portions 138 enter the connection end 169 of the operation member 133 (see FIG. 22A).

(2) When the Operation Member 133A is Attached

When the operation member 133A moves backward, the pair of left and right front acting portions 135a are pushed downward by the guide portions 138 and move so as to be brought closer to the inner sides in the left-right direction, thereby entering into the connection end 169 of the operation member 133A. The extension portion 139 of the front acting portion 135a on the left side in the vehicle width direction straddles the operation member side protrusion 173 by being pushed downward by the inclined surface 174 of the operation member side protrusion 173.

(3) After the Operation Member 133A is Attached

The engaging surface 175 of the operation member side protrusion 173 faces the front side acting portion 135a on the left side in the vehicle width direction, thereby preventing the operation member 133A from moving forward (in the removal direction). Further, the rear end surface of the operation member 133A faces the movement prevention protrusions 147d, thereby preventing the operation member 133A from further moving backward (in the pushing direction).

As illustrated in FIG. 23, the lever member 131A is turnably supported at the upper side walls 105b of the upper rail 105 by the shaft member 115, and the biasing member 132A is engaged with the engaging portion 105g in such a way as to prevent the biasing member 132A from moving downward. In addition, on the left and right upper side walls 105b of the upper rail 105, a rear lower protrusion 148 is formed at a position forward of the bearing hole 105f in the vehicle front-rear direction as a rear lower support portion protruding from both upper side walls 105b in such a way as to bend toward the sides facing each other. The rear lower protrusion 148 is formed by cutting and raising the upper side walls 105b toward the inner side.

The pair of front acting portions 135a of the biasing member 132A engage with the lower surface of the rear end of the operation member 133A (the inner surface of the upper surface 169b1) from below at a position below between the front upper support surface 157a and the rear upper support surface 158a, thereby biasing the operation member 133A upward. Thus, the upper surface 169b1 of the operation member 133A comes into contact with the pair of upper support surfaces (the front upper support surface 157a and the rear upper support surface 158a). At this time, a clearance C1 is provided in the up-down direction between the front lower support surface 147c provided in the lever member 131A and the lower surface 169b3 of the rear end of the operation member 133A, and a clearance C2 is provided in the up-down direction between the rear lower support surface 148a provided in the upper rail 105 and the lower surface 169b3 of the rear end of the operation member 133A.

In this regard, as illustrated in FIG. 23, on one side (right side in the vehicle width direction), regarding the length L1b between the contact point between the engaging portion 105g and the intermediate support portion 137 of the biasing member 132 (support point P0) and the contact point between the front end of the lever member 131 and the front acting portion 135a of the biasing member 132 (front acting point P1b), and regarding the length L2 between the contact point between the engaging portion 105g and the intermediate support portion 137 of the biasing member 132A (support point P0) and the contact point between the rear end of the lever member 131A and the rear acting portion 136a of the biasing member 132A (rear acting point P2), the length L1b is shorter than the length L2 (L1b<L2).

In contrast, on the other side (left side in the vehicle width direction), regarding the length L1a between the contact point between the engaging portion 105g and the intermediate support portion 137 of the biasing member 132A (support point P0) and the contact point between the front end of the lever member 131A and the front acting portion 135a of the biasing member 132A (front acting point P1a), and regarding the length L2 between the contact point between the engaging portion 105g and the intermediate support portion 137 of the biasing member 132 (support point P0) and the contact point between the rear end of the lever member 131A and the rear acting portion 136a of the biasing member 132A (rear acting point P2), the length L1a is approximately the same as the length L2 (L1a≈L2).

The rotational moment at the support point P0 is $[F1a*L1a+F1b*L1b=F2*L2]$ from the moment balance $[M0=(F1a*L1a+F1b*L1b)-F2*L2=0]$ when the biasing forces acting on the front acting points P1a and P1b are front biasing forces F1a and F1b and when the biasing force acting on the rear acting point P2 is a rear biasing force F2. In the present embodiment, the length L1b between the support point P0 and one front acting point P1b is set to be shorter than the length L2 between the support point P0 and the rear acting point P2 (L1b<L2). In contrast, in the present embodiment, the length L1a between the support point P0 and the other front acting point P1a is almost the same as the length L2 between the support point P0 and the rear acting point P2 (L1a≈L2). That is, the force (F1a+F1b) that biases the front end of lever member 131A upward (in the lock release direction) is larger than the force F2 that biases the rear end of lever member 131A upward (in the lock direction) ((F1a+F1b)>F2).

Here, the length between the turning center Q of the lever member 131A and the contact point between the front end of the lever member 131A and the other front acting portion 135a of the biasing member 132A (front acting point P1a) is defined as "L3a". In contrast, the length between the turning center Q of the lever member 131A and the contact point between the front end of the lever member 131A and one front acting portion 135a of the biasing member 132A (front acting point P1b) is defined as "L3b". In addition, the length between the turning center Q of the lever member 131A and the contact point of the rear end of the lever member 131A and the rear acting portion 136a of the biasing member 132A (rear acting point P2) is defined as "L4". At this time, the lengths L3a, L3b and L4 are set such that the rotational moment on the rear-end side (Mb=F2*L4) is larger than a total Ma of the rotational moments on the front-end side (Ma1+Ma2=F1a*L3a+F1b*L3b) in the lever member 131A.

In the present embodiment, the length L3a is shorter than the length L1a (L1a>L3a), the length L3b is shorter than the length L1b (L1b>L3b), and the length L2 is shorter than the length L4 (L2<L4). This makes it possible for the rotational moment on the rear-end side (Mb=F2*L4) to become larger than the total Ma of the rotational moments on the front-end side (Ma1+Ma2=F1a*L3a+F1b*L3b) at the turning center Q of the lever member 131A.

As a result, the rotational moment at the turning center Q of the lever member 131A acts as a biasing force that biases the rear end of the lever member 131A (lock member 117) in the lock direction.

Figure 24:
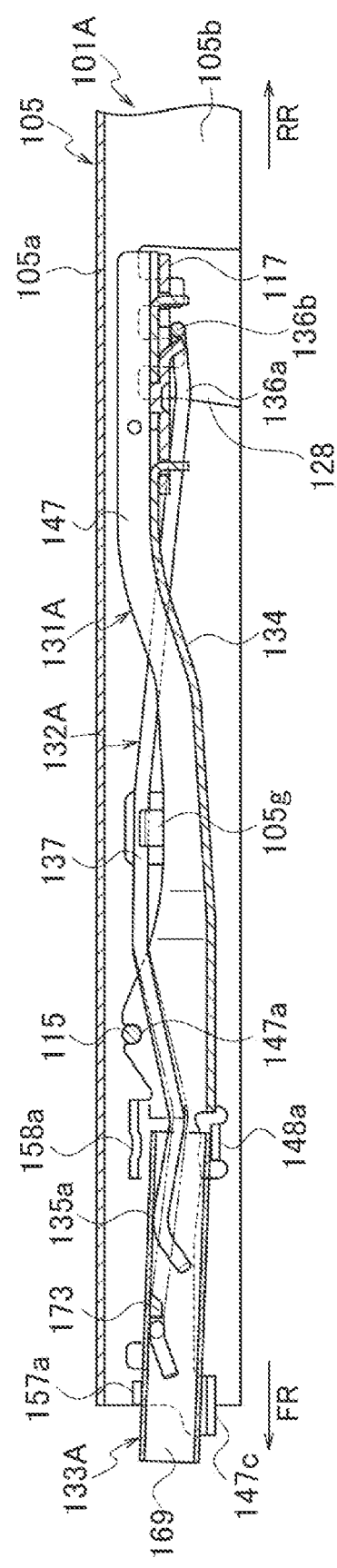
FIG. 24 is a side sectional view of the enlarged main portion of the seat sliding device illustrating a state operating the operation member in the lock release direction.
Figure 25:
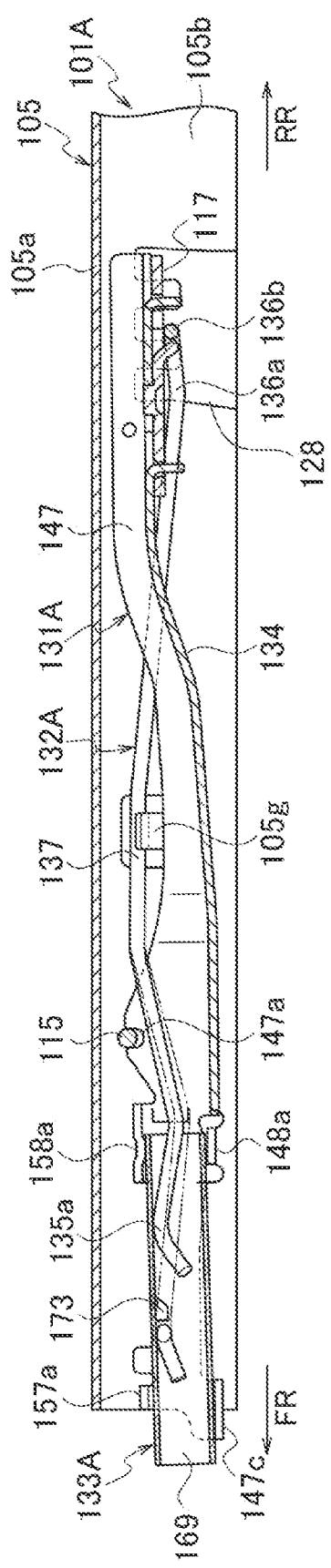
FIG. 25 is a side sectional view of the enlarged main portion of the seat sliding device illustrating a state in which the load in the anti-lock release direction acts on the operation member.

Next, the operation of the seat sliding device 101A configured as above will be described in FIGS. 24 and 25. However, the operation is the same as that of the first embodiment, and thus a description thereof will be omitted.

The operational effects of the seat sliding device 101A according to the second embodiment will be described below. The operational effects common to those of the first embodiment described above will not be described.

In the second embodiment, the biasing member 132A is formed of a pair of left and right bar-shaped members extending approximately parallel to each other and includes a pair of front acting portions 135a configured to come in contact with the front end of the lever member 131A to bias the front end of the lever member 131A upward, a pair of left and right rear acting portions 136a configured to come in contact with the rear end of the lever member 131A to bias the rear end of the lever member 131A upward, a pair of left and right intermediate support portions 137 configured to be engaged with the pair of engaging portions 105g which are formed at the same positions with respect to the vehicle front-rear direction and the up-down direction, and a connecting portion 136b configured to connect the respective rear ends of the pair of left and right rear acting portions 136a, such that the biasing member 132A is formed into an approximately U-shape in plan view. The length L1b between the contact point between at least one of the engaging portions 105g and the intermediate support portion 137 of the biasing member 132A and the contact point between the front end of the lever member 131A and at least one of the front acting portions 135a is shorter than the length L2 between the contact point between at least one of the engaging portions 105g and the intermediate support portion 137 of the biasing member 132A and the contact point between the rear end of the lever member 131A and at least one of the rear acting portions 136a.

A rotational moment in the lock direction is generated at the rear end of the lever member 131A, and an upward biasing force of the biasing member 132A can be enhanced at the front end of the lever member 131A.

The rotational moment at the support point P0 is [F1a*L1a+F1b*L1b=F2*L2] from the moment balance. Here, the length L1b is set to be shorter than the length L2 (L1b<L2), and thus (L3b<L1b<L2<L4) is obtained and the biasing force [(F1a+F1b)>F2)] is obtained.

As a result, a rotational moment in the lock direction is generated at the rear end of the lever member 131A, and an upward biasing force of the biasing member 132A can be enhanced at the front end of the lever member 131A.

Although the embodiments of the present invention have been described above, these embodiments are merely illustrative in order to facilitate understanding of the present invention, and the present invention is not limited to these embodiments. The technical scope of the present invention is not limited to the specific technical matters disclosed in the above embodiments, and also includes various modifications, changes, alternative techniques and the like which can be readily derived therefrom.

For example, although the respective rear ends of the pair of left and right rear acting portions 136a are connected to each other by the connecting portion 136b in the above described embodiment, the rear ends of the lever member 131 may be biased upward separately without connection. Further, the biasing member 132 is formed of a pair of left and right bar-shaped members, however the biasing member 132 may be provided only on the left or the right side (one side).

Further, the length L1 between the support point P0 and the front acting point P1 is shorter than the length L2 between the support point P0 and the rear acting point P2, however, the length L1 and the length L2 may be approximately the same length. The length L1 may be longer than the length L2 in a case where the front biasing force F1 can be small, such as when the front end of the lever member 131 is not biased upward through the operation member 133 (e.g. when another biasing member is provided).

Further, the front acting portions 135a of the biasing member 132 are inserted inside the operation member 133, however, the outer lower surface (lower surface 169b3) may be biased upward from the lower side.

Furthermore, the upper protrusions 157 and 158 are respectively provided at the upper ends of both side walls 147, however, they may be provided only at the upper end of one side wall 147.

In addition, the lower ends of the front ends of the lever member 131 are connected to each other by the front lower wall 147b, however, the front upper protrusions 157 may be connected to each other. In this case, the lever member 131 has an inverted U-shape with an open lower end, in which the lower wall 134 connecting the lower ends of the left and right side walls 147 serves as the upper wall connecting the upper ends thereof.

What is claimed is:

1. A seat sliding device comprising:
   a lower rail extending in a vehicle front-rear direction;
   an upper rail configured to move relative to the lower rail in a longitudinal direction;
   a lever member turnably supported about an axis in a left-right direction with respect to the upper rail;
   a lock member provided at a rear end of the lever member and including lock portions configured to be movable between a lock position where the lock portions are engaged with locked portions formed in the lower rail and a release position where the lock portions are disengaged from the locked portions;
   a biasing member configured to bias the lock portions in a lock position direction; and
   an operation member connected to a front end of the lever member,
   wherein the biasing member includes:
      a front acting portion configured to come in contact with the operation member at a position forward of a turning center of the lever member to bias the front end of the lever member upward via the operation member;
      a rear acting portion configured to come in contact with the lock member at a position rearward of the turning center of the lever member to bias the rear end of the lever member upward via the lock member; and
      an intermediate support portion formed between the front acting portion and the rear acting portion and engaged with an engaging portion formed in the upper rail, and
   wherein the engaging portion is positioned rearward of the turning center of the lever member and supports the intermediate support portion through contact with the intermediate support portion in such a way as to prevent the intermediate support portion from moving downward.

2. The seat sliding device according to claim 1, wherein a length between a contact point between the engaging portion and the intermediate support portion of the biasing member and a contact point between the operation member and the front acting portion of the biasing member is shorter than a length between the contact point between the engaging portion and the intermediate support portion of the biasing member and a contact point between the lock member and the rear acting portion of the biasing member.

3. The seat sliding device according to claim 1, wherein the lever member includes:
- a pair of left and right side walls extending relative to the upper rail in the longitudinal direction and facing each other with a clearance therebetween in the left-right direction;
- a front upper support portion provided at an upper end of a front end of a first side wall of the pair of left and right side walls and protruding in the left-right direction toward a second side wall of the pair of left and right side walls; and
- a front lower support portion provided at a lower end of the front end of the first side wall of the pair of left and right side walls and protruding in the left-right direction toward the second side wall of the pair of left and right side walls, the front end of the lever member has a substantially square cross-section defined by the pair of left and right side walls and the front upper support portion and the front lower support portion, a rear end of the operation member is inserted inside the front end of the lever member, and the biasing member includes:
- a rear biasing portion extending from the intermediate support portion to the rear acting portion and biasing the rear end of the lever member upward via the lock member; and
- a front biasing portion extending from the intermediate support portion to the front acting portion and biasing the front end of the lever member upward via the operation member.

4. The seat sliding device according to claim 3, wherein the pair of left and right side walls of the lever member define a pair of recesses positioned between the turning center of the lever member and the lock member in the vehicle front-rear direction, the clearance at the recesses is narrower than the clearance at the front end of the lever member or the clearance at the rear end of the lever member, the rear acting portion of the biasing member is positioned below the lever member, the intermediate support portion of the biasing member between the rear acting portion and the front acting portion extends upward of the lever member through the recesses, and the front acting portion of the biasing member is bent inward in the left-right direction and extends forward between the pair of left and right side walls of the lever member.

5. The seat sliding device according to claim 1, wherein the upper rail includes a shaft member disposed in such a way as to straddle both left and right side walls of the upper rail, the lever member includes recessed grooves opening upward and provided at upper ends of a pair of left and right side walls extending relative to the upper rail in the longitudinal direction, and the recessed grooves are engaged with the shaft member from below, and the front end of the lever member and the rear end of the lever member are biased upward by the biasing member so as to maintain a state in which the recessed grooves are engaged with the shaft member and the lever member is turnably supported with respect to the upper rail.

6. The seat sliding device according to claim 1, wherein the biasing member includes:
- a pair of left and right front acting portions defining the front acting portion and configured to come in contact with a rear end of the operation member to bias the front end of the lever member upward via the operation member;
- a pair of left and right rear acting portions including the rear acting portion and configured to come in contact with the lock member to bias the rear end of the lever member upward via the lock member;
- a pair of left and right intermediate support portions defining the intermediate support portion and configured to be engaged with a pair of engaging portions that define the engaging portion and are formed at a same position in the vehicle front-rear direction and at a same elevation in an up-down direction; and
- a connecting portion configured to connect respective rear ends of the pair of left and right rear acting portions, such that the biasing member defines an approximately U-shape in plan view, and a length between a contact point between at least one engaging portion of the pair of engaging portions and at least one intermediate support portion of the pair of intermediate support portions of the biasing member and a contact point between the operation member and at least one front acting portion of the pair of left and right front acting portions is shorter than a length between the contact point between the at least one engaging portion of the pair of engaging portions and the at least one intermediate support portion of the pair of intermediate support portions of the biasing member and a contact point between the lock member and at least one rear acting portion of the pair of left and right rear acting portions.

* * * * *